(12) United States Patent
Claussen et al.

(10) Patent No.: US 8,743,658 B2
(45) Date of Patent: Jun. 3, 2014

(54) SYSTEMS AND METHODS FOR BLIND LOCALIZATION OF CORRELATED SOURCES

(75) Inventors: Heiko Claussen, Plainsboro, NJ (US); Justinian Rosca, West Windsor, NJ (US); Thomas Wiese, Munich (DE)

(73) Assignee: Siemens Corporation, Iselin, NJ (US)

( * ) Notice: Subject to any disclaimer, the term of this patent is extended or adjusted under 35 U.S.C. 154(b) by 497 days.

(21) Appl. No.: 13/097,628

(22) Filed: Apr. 29, 2011

(65) Prior Publication Data

US 2012/0275271 A1 Nov. 1, 2012

(51) Int. Cl.
G01S 3/80 (2006.01)
G01S 3/74 (2006.01)

(52) U.S. Cl.
CPC . *G01S 3/8006* (2013.01); *G01S 3/74* (2013.01)
USPC .......................................... 367/124; 367/118

(58) Field of Classification Search
USPC .......................................... 367/118, 124, 129
See application file for complete search history.

(56) References Cited

U.S. PATENT DOCUMENTS

2006/0245601 A1* 11/2006 Michaud et al. ............... 381/92

OTHER PUBLICATIONS

Ward et al., "Particle Filtering Algorithms for Acoustic SOurce Localization," IEEE Transactions on Speech and Audio Processing, vol. II, 2002, pp. 1777-1780.*
S. Arulampalam, S. Maskell, N. Gordon, and T. Clapp. A tutorial on particle filters for on-line non-linear/non-gaussian bayesian tracking. *IEEE Transactions on Signal Processing*, 50: 174-188, 2001.
R. G. Gallager. Circularly-symmetric gaussian random vectors. Class Notes, Jan. 2008.
M. Jansson, A. L. Swindlehurst, and B. Ottersten. Weighted subspace fitting for general array error models. *IEEE Transactions on Signal Processing*, 46: 2484-2498, 1997.
T. Melia and S. Rickard. Underdetermined blind source separation in echoic environments using desprit, 2007.
S. Rickard, R. Balan, and J. Rosca. Real-time time-frequency based blind source separation. In *Proc. of International Conference on Independent Component Analysis and Signal Separation (ICA2001)*, pp. 651-656, 2001.
H. Krim and M. Viberg. Two decades of array signal processing research: the parametric approach. Signal Processing Magazine, IEEE, 13(4): 67-94, Jul. 1996.
R. Roy and T. Kailath. Esprit-estimation of signal parameters via rotational invariance techniques. Acoustics, Speech and Signal Processing, IEEE Transactions on, 37(7):984, Jul. 1989.
R. Schmidt. Multiple emitter location and signal parameter estimation. Antennas and Propagation, IEEE Transactions on, 34(3):276, Mar. 1986.

(Continued)

*Primary Examiner* — Ian J Lobo
(74) *Attorney, Agent, or Firm* — Donald B. Paschburg

(57) ABSTRACT

A system and a method for a blind direction of arrival estimation is provided for a nonlinear 1-dimensional array of M receivers of J<M unknown signals transmitted through an unknown channel and subject to Gaussian noise. The method overcomes the conditions of that signals be disjoint in the time-frequency domain and/or statistically independent. A likelihood function evaluates a probability for the directions of arrivals. A weighting and regularization scheme selects relevant frequency components. A joint likelihood function of all frequencies is interpreted as a cost or objective function. The time domain is included into the estimation procedure by using a particle filter that operates on the constructed likelihood function and a simple transition kernel for the directions.

20 Claims, 23 Drawing Sheets

(56) References Cited

OTHER PUBLICATIONS

W. Ng, J.P. Reilly, and T.Kirubarajan. A bayesian approach to tracking wideband targets using sensor arrays and particle filters. Statistical Signal Processing, 2003 IEEE Workshop on, pp. 510-513, 2003.
James A. Cadzow. Multiple source localization—the signal subspace approach. IEEE Transactions on Acoustics, Speech, and Signal Processing, 38(7):1110-1125, Jul. 1990.
Yeo-Sun Yoon, L.M. Kaplan, and J.H. McClellan. Tops: new doa estimator for wideband signals. Signal Processing, IEEE Transactions on, 54(6):1977, Jun. 2006.
E.D. di Claudio and R. Parisi. Waves: weighted average of signal subspaces for robust wideband direction finding. Signal Processing, IEEE Transactions on, 49(10):2179, Oct. 2001.
M. Viberg and B. Ottersten. Sensor array processing based on subspace fitting. Signal Processing, IEEE Transactions on, 39(5):1110-1121, May 1991.
H. Sawada, R. Mukai, S. Araki, and S. Makin. A robust and precise method for solving the permutation problem of frequency-domain blind source separation. Speech and Audio Processing, IEEE Transactions on, 12(5):530-538, 2004.
C. Andrieu and A. Doucet. Joint Bayesian model selection and estimation of noisy sinusoids via reversible jump mcmc. Signal Processing, IEEE Transactions on, 47(10):2667-2676, Oct. 1999.

* cited by examiner

SYSTEMS AND METHODS FOR BLIND LOCALIZATION OF CORRELATED SOURCES

BACKGROUND

The present invention relates to blind separation of signals. More specifically, this invention relates to blind separation of signals also called direction of arrival of signals generated by sources that are correlated.

Power generation main components (e.g., turbines, generators, boilers, transformers as well as related auxiliary equipment such as boiler feed pumps, cooling water pumps, fans, valves, exhaust gas cleaning systems) operational issues are normally characterized by changes in their acoustic signatures (in sonic and most importantly, ultrasonic ranges), e.g., arcing, bearing or lubrication issues, loose parts, leaks, etc. Contact based acoustic emission monitoring of all subcomponents of e.g., auxiliary equipment that is non-critical for the continuation of the plant operation is generally uneconomic. Non-contact, microphone-based systems could monitor a large area with a multitude of different types of equipments simultaneously. The concept of this area monitoring is illustrated in FIG. 1. Here, a fault is identified to come from the device under test (DUT) number 2 using a microphone array containing sensors or microphones numbers 1, 2 and 3 and source localization instructions implemented on a processor.

Challenges of this scenario are as follows. State-of-the art source separation and localization approaches that use time-frequency masking will have problems due to the broad band characteristics of acoustic emissions from power generation equipment and the ensuing signal overlap in the time-frequency domain. In particular, the commonly used sparseness assumption that signals be disjoint in the time-frequency domain is violated and algorithms that build on this assumption, like e.g. DUET, will fail. Another assumption required by many algorithms like ESPRIT, MUSIC or Weighted Subspace Fitting such as disclosed in "M. Jansson, A. L. Swindlehurst, and B. Ottersten. Weighted subspace fitting for general array error models. *IEEE Transactions on Signal Processing*, 46: 2484-2498, 1997" and "T. Melia and S. Rickard. Underdetermined blind source separation in echoic environments using desprit, 2007" is that all signals be independent. This assumption may be approximately true for speech signals but not necessarily for machine vibrations.

Accordingly, improved and novel methods and systems for blind separation of signals that are not disjoint and/or independent and/or uncorrelated are required.

SUMMARY

In a context of acoustic plant surveillance, a blind direction of arrival estimation scheme is provided for a nonlinear 1-dimensional array of M receivers of J<M unknown signals transmitted through an unknown channel and subject to Gaussian noise. The methods and systems provided in accordance with at least one aspect of the present invention overcome the conditions of current state-of-the-art methods that signals be disjoint in the time-frequency domain (W-orthogonality) and/or statistically independent. Based on a model that relates signals and measurements, a likelihood function for the directions of arrivals is constructed. To select relevant frequencies, a new weighting and regularization scheme is provided and the joint likelihood function of all frequencies is interpreted as a cost or objective function. The time domain is included into the estimation procedure by using a particle filter that operates on the constructed likelihood function and a simple transition kernel for the directions. An approach to evaluate the results is also provided.

In accordance with an aspect of the present invention a method is provided for determining a direction of arrival of a signal generated by a source in a plurality of sources, comprising: a processor estimating a first direction of arrival for a previous signal generated by the source with a particle filter operating in a time-frequency domain, receiving by a plurality of receivers a plurality of signals from the plurality of sources, the plurality of signals including the signal, at least two of the received signals being correlated, the processor determining a regularization factor and a weighting factor for each of a plurality of frequency components of the signal, the processor determining a likelihood for the direction of arrival for each of the plurality of frequency components of the signal based on the regularization factor and the weighting factor, the processor determining a global likelihood for the direction of arrival of the signal based on the likelihood for the direction of arrival for each of the plurality of frequency components of the signal, the processor updating a plurality of weights of the particle filter, and the processor generating an estimate of the direction of arrival of the signal by applying the updated weights of the particle filter.

In accordance with a further aspect of the present invention the method is provided, wherein the global likelihood $L(\theta)$ is determined by an expression $$L(\theta) = \sum_{n=1}^{N} L_n^{reg}(\theta)\lambda_n,$$

with $\theta$ representing a vector of all directions-of-arrivals for all the sources in the plurality of sources, n represents a frequency component, N represents a total number of frequency components, $L_n^{reg}(\theta)\lambda_n$ is a regularized likelihood of all directions-of-arrivals for all the sources adjusted by a normalized weighting factor $\lambda_n$ for a frequency component n.

In accordance with yet a further aspect of the present invention the method is provided, wherein the weighting factor for a frequency component n is a normalized weighting factor $\lambda_n$ that is determined by an expression $$\lambda_n = \frac{\tau_n}{\sum_{n=1}^{N} \tau_n},$$

wherein $$\tau_n = \varphi\left(\frac{\|\hat{P}_n(\theta)X_n\|}{\|X_n\|}\right),$$

with $\tau_n$ representing an un-normalized weighting factor, $\hat{P}_n(\theta)$ representing a regularized projector for a frequency component n on a signal subspace, $\theta$ representing a vector of all directions-of-arrivals for all the sources in the plurality of sources, $X_n$ representing a vector of frequency components n of the plurality of signals received by the plurality of receivers and $\varphi$ representing a non-negative non-decreasing weighting function.

In accordance with a further aspect of the present invention the method is provided, further comprising the processor determining a Maximum A Posteriori likelihood (MAP) estimate of a frequency component of the signal.

In accordance with a further aspect of the present invention the method is provided, wherein the MAP estimate represented by $\hat{S}_n(\theta)$ is determined by an expression $\hat{S}_n(\theta) = (A_n^H A + \lambda_n I)^{-1} A_n^H X_n$, with $\theta$ representing a vector of all directions-of-arrivals for all the sources in the plurality of sources, A representing a steering matrix. $A_n^H$ representing a Hermitian of a steering matrix for a frequency component n, $\lambda_n$ representing a regularization factor for a frequency component n, I representing an identity matrix and $X_n$ representing a vector of frequency components n of the plurality of signals received by the plurality of receivers.

In accordance with a further aspect of the present invention the method is provided, wherein the updated weights $w_i^k$ of the particle filter are determined by an expression:

$$w_i^k = \frac{w_i^{k-1} p(X_{1:N} | \theta_i^k)}{\sum_{i=1}^{P} w_i^{k-1} p(X_{1:N} | \theta_i^k)},$$

with k representing an update time, i representing a particle index, p representing a probability distribution function. P representing a total number of particles, $X_{1:N}$ representing a vector of frequency components at moment k, and $\theta_i^k$ representing a direction of arrival estimate of particle i at moment k.

In accordance with a further aspect of the present invention the method is provided, wherein the global likelihood is adjusted with a scaling parameter.

In accordance with a further aspect of the present invention the method is provided, wherein at least one source in the plurality of sources is a moving source.

In accordance with a further aspect of the present invention the method is provided, wherein a signal is an acoustic signal.

In accordance with a further aspect of the present invention the method is provided, wherein at least one source in the plurality of sources is associated with a power generator.

In accordance with an aspect of the present invention a system is provided to determine a direction of arrival of a signal generated by a source in a plurality of sources, comprising a memory enabled to store data and instructions, a processor enabled to retrieve and execute instructions from the memory to perform the steps: estimating a first direction of arrival for a previous signal generated by the source with a particle filter operating in a time-frequency domain, processing a plurality of signals from the plurality of sources received by a plurality of receivers, the plurality of signals including the signal, at least two of the received signals being correlated, determining a regularization factor and a weighting factor for each of a plurality of frequency components of the signal, determining a likelihood for the direction of arrival for each of the plurality of frequency components of the signal based on the regularization factor and the weighting factor, determining a global likelihood for the direction of arrival of the signal based on the likelihood for the direction of arrival for each of the plurality of frequency components of the signal, updating a plurality of weights of the particle filter, and generating estimates of the direction of arrival of the signal by applying the updated weights of the particle filter.

In accordance with another aspect of the present invention the system is provided, wherein the global likelihood $L(\theta)$ is determined by an expression $$L(\theta) = \sum_{n=1}^{N} L_n^{reg}(\theta) \lambda_n,$$

with $\theta$ representing a vector of all directions-of-arrivals for all the sources in the plurality of sources, n represents a frequency component, N represents a total number of frequency components, $L_n^{reg}(\theta)\lambda_n$ is a regularized likelihood of all directions-of-arrivals for all the sources adjusted by a normalized weighting factor $\lambda_n$ for a frequency component n.

In accordance with yet another aspect of the present invention the system is provided, wherein the weighting factor for a frequency component n is a normalized weighting factor $\lambda_n$ that is determined by an expression:

$$\lambda_n = \frac{\tau_n}{\sum_{n=1}^{N} \tau_n},$$

wherein $$\tau_n = \varphi\left( \frac{\|\hat{P}_n(\theta) X_n\|}{\|X_n\|} \right),$$

with $\tau_n$ representing an un-normalized weighting factor, $\hat{P}_n(\theta)$ representing a regularized projector for a frequency component n on a signal subspace, $\theta$ representing a vector of all directions-of-arrivals for all the sources in the plurality of sources, $X_n$ representing a vector of frequency components n of the plurality of signals received by the plurality of receivers and $\varphi$ representing a non-negative non-decreasing weighting function.

In accordance with yet another aspect of the present invention the system is provided, further comprising the processor determining a Maximum A Posteriori likelihood (MAP) estimate of a frequency component of the signal.

In accordance with yet another aspect of the present invention the system is provided, wherein the MAP estimate represented by $\hat{S}_n(\theta)$ is determined by an expression $\hat{S}_n(\theta) = (A_n^H A + \lambda_n I)^{-1} A_n^H X_n$, with $\theta$ representing a vector of all directions-of-arrivals for all the sources in the plurality of sources. A representing a steering matrix, $A_n^H$, representing a Hermitian of a steering matrix for a frequency component n, $\lambda_n$ representing a regularization factor for a frequency component n, I representing an identity matrix and $X_n$ representing a vector of frequency components n of the plurality of signals received by the plurality of receivers.

In accordance with et another aspect of the present invention the system is provided, wherein the updated weights $w_i^k$ of the particle filter are determined by an expression:

$$w_i^k = \frac{w_i^{k-1} p(X_{1:N} | \theta_i^k)}{\sum_{i=1}^{P} w_i^{k-1} p(X_{1:N} | \theta_i^k)},$$

with k representing an update time, i representing a particle index, p representing a probability distribution function. P representing a total number of particles, $X_{1:N}$ representing a vector of frequency components at moment k, and $\theta_i^k$ representing a direction of arrival estimate of particle i at moment k.

In accordance with yet another aspect of the present invention the system is provided, wherein the global likelihood is adjusted with a scaling parameter.

In accordance with yet another aspect of the present invention the system is provided, wherein at least one source in the plurality of sources is a moving source.

In accordance with yet another aspect of the present invention the system is provided, wherein a signal is an acoustic signal.

In accordance with yet another aspect of the present invention the system is provided, wherein at least one source in the plurality of sources is associated with a power generator.

DESCRIPTION OF AN EMBODIMENT

Figure 1:
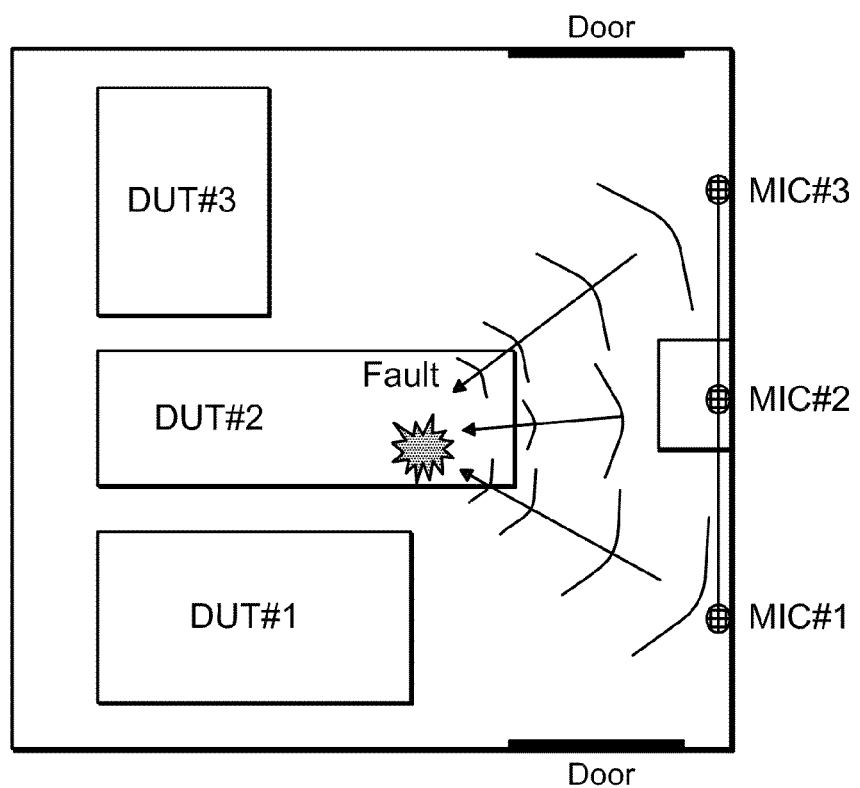
FIG. 1 illustrates a system set-up.

Herein a direction-of-arrival (DOA) estimation method and system is provided for wideband sources that are based on the Bayesian paradigm. The method provided in accordance with an aspect of the present invention approximates the posterior probability density function of the DOAs in time-frequency domain with a particle filter. In contrast to other methods, no time-averaging is necessary, therefore moving sources can be tracked. The herein provided method uses a new low complexity weighting and regularization scheme to fuse information from different frequencies and to overcome the problem of overfitting when few sensors are available.

The direction of arrival (DOA) problem is an important problem in array signal processing and closely intertwined with the discipline of blind source separation (BSS). Both fields have given rise to rich research and abundant number of methods, undoubtedly for the many applications in areas as different as radar, wireless communications or speech recognition as described in "H. Krim and M. Viberg. Two decades of array signal processing research: the parametric approach. Signal Processing Magazine, IEEE, 13(4): 67-94, July 1996." DOA estimation requires an antenna array and exploit time differences of arrival between sensors. Narrowband DOA algorithms use phase shifts to approximate time differences of arrival between noisy measurements of different microphones. This establishes an algebraic statistical relationship between received and emitted signals. Methods exist that attempt to solve this problem. Most of these are variants of ESPRIT as described in "R. Roy and T. Kailath. Esprit-estimation of signal parameters via rotational invariance techniques. Acoustics, Speech and Signal Processing, IEEE Transactions on, 37(7):984, July 1989" or MUSIC as described in "R. Schmidt. Multiple emitter location and signal parameter estimation. Antennas and Propagation, IEEE Transactions on, 34(3):276, March 1986" that use subspace fitting techniques as described in "M. Viberg and B. Ottersten. Sensor array processing based on subspace fitting. Signal Processing, IEEE Transactions on, 39(5):1110-1121, May 1991" and are fast to compute a solution. Statistically optimal methods such as Maximum Likelihood (ML) as described in "P. Stoica and K. C. Sharman. Acoustics, speech and signal processing, Acoustics, Speech and Signal Processing, IEEE Transactions on, 38(7):1132, July 1990" or Bayesian methods as described in "J. Lasenby and W. J. Fitzgerald. A bayesian approach to high-resolution beamforming. Radar and Signal Processing, IEE Proceedings F, 138(6):539-544, December 1991" were long considered intractable as described in "James A. Cadzow. Multiple source localization—the signal subspace approach. IEEE Transactions on Acoustics, Speech, and Signal Processing, 38(7):1110-1125. July 1990", but have been receiving more attention recently in for instance "C. Andrieu and A. Doucet. Joint Bayesian model selection and estimation of noisy sinusoids via reversible jump mcmc. Signal Processing, IEEE Transactions on, 47(10):2667-2676, October 1999" and "J. Huang, P. Xu, Y. Lu, and Y. Sun. A novel bayesian high-resolution direction-of-arrival estimator. OCEANS, 2001. MTS/IEEE Conference and Exhibition, 3:1697-1702, 2001."

Many methods for wideband DOA estimation are formulated in the time-frequency domain. The narrowband assumption is then valid for each subband or frequency bin. Incoherent signal subspace methods (ISSM) compute DOA estimates that fulfill the signal and noise subspace orthogonality condition in all subbands simultaneously. On the other hand, coherent signal subspace methods (CSSM) as described in "H. Wang and M. Kaveh. Coherent signal-subspace processing for the detection and estimation of angles of arrival of multiple wide-band sources. Acoustics, Speech and Signal Processing, IEEE Transactions on, 33(4):823, August 1985" compute a universal spatial covariance matrix (SCM) from all data. Any narrowband signal subspace method can then be used to analyze the universal SCM and estimate the DOAs.

However, good initial DOA estimates are necessary to correctly cohere the subband SCMs into the universal SCM as described in "D. N. Swingler and J. Krolik. Source location bias in the coherently focused high-resolution broad-band beamformer. Acoustics, Speech and Signal Processing, IEEE Transactions on, 37(1):143-145, January 1989." Methods like BI-CSSM as described in "Ta-Sung Lee. Efficient wideband source localization using beamforming invariance technique. Signal Processing. IEEE Transactions on, 42(6):1376-1387, June 1994" or TOPS as described in "Yeo-Sun Yoon, L. M. Kaplan, and J. H. McClellan. Tops: new doa estimator for wideband signals. Signal Processing, IEEE Transactions on, 54(6):1977, June 2006" were developed to alleviate this problem. Subspace algorithms use orthogonality of signal and noise subspaces as the criterion of optimality. Yet, a mathematically more appealing approach is to ground the estimation process on a decision theoretic framework, enabling cross-layer optimization. A prerequisite is the computation of the posterior probability density function (pdf) of the DOAs, which can be achieved by employing particle filters. Such an approach is taken in "W. Ng, J. P. Reilly, and T. Kirubarajan. A bayesian approach to tracking wideband targets using sensor arrays and particle filters. Statistical Signal Processing, 2003 IEEE Workshop on, pages 510-513, 2003" where a Bayesian maximum a posteriori (MAP) estimator is formulated in the time domain.

As an aspect of the present invention, a Bayesian MAP estimator is provided using the time-frequency representation of the signals. The advantage of time-frequency analysis is shown by techniques used in the field of blind source separation (BSS) such as DUET described in "Scott Rickard, Radu Balan, and Justinian Rosca. Real-time time-frequency based blind source separation. In Proc. of International Conference on Independent Component Analysis and Signal Separation (ICA2001), pages 651-656, 2001" and DESPRIT described in "Thomas Melia and Scott Rickard. Underdetermined blind source separation in echoic environments using desprit, 2007." These methods exploit dissimilar signal fingerprints to separate signals and, in a second step, estimate their DOAs. For example, speech signals are generally disjoint in time-frequency domain and single DOAs can be computed for each frequency bin separately. A power weighted histogram combines frequency information and clustering is used to find the true DOAs.

A method provided as an aspect of the present invention uses a novel, heuristical weighting scheme to combine information across frequencies. A particle filter approximates the posterior density of the DOAs, which is then used to extract a maximum a posteriori estimate.

First a method will be explained in terms of blind localization. An explanation in terms of direction-of-arrival is also provided.

FIG. 1 illustrates a floor plan of a room including a device under test (DDT) number 1 to 3 as top view with microphone installation, including microphones 1, 2 and 3. The location of a faulty subsystem in DUT#2 is found by triangulation using its airborne acoustic emissions. A method provided herein in accordance with an aspect of the present invention overcomes the condition of time-frequency orthogonality and does not impose any conditions on signal correlations.

In accordance with at least one aspect of the present invention a signal model is provided that is used in a localization method. A source localization approach and a particle filter extension to this approach will be provided below. Subsequently, results of simulations as well as field experiments are also provided.

Problem Formulation

Time-discrete mixtures $x_1(t), \ldots, x_M(t)$ from an array of M closely-spaced microphones recording J source signals $s_1(t), \ldots, s_J(t)$, so that $$x_M(t) = \sum_{j=1}^{J} s_j(t - \tau_{mj}) \tag{1}$$

Here, $\tau_{mj}$ is the delay of signal j at microphone m with regard to microphone 1. The microphones are linearly aligned but not necessarily equally spaced with known distances $d_m$ between microphones 1 and m. The distances are assumed to be small with regard to source distances. In particular, attenuation of source signals between microphones is considered to be negligible and the wave fronts are plane. The delays $\tau_{mj}$ then follow the relation $\tau_{mj}=\delta_j d_m$, where $\delta_j$ is the delay per meter of signal j with regard to the array axis. Note that $\delta_j$ holds the direction of arrival information of signal j and therefore $\delta_j$ is referred to as direction. A discrete windowed Fourier transform is used and it is assumed that $F\{x(t-\tau)\}=F(x(t))e^{-i\omega_n\tau}$ to hold for each discrete frequency $\omega_n$. In this case, the relationship between signals and recordings is linear in the time-frequency (t-f) domain and can be described on a per frequency basis.

Using uppercase letters for Fourier representations the relationship reads $$X_m(\omega_n, \tau_k) = \sum_{j=1}^{J} S_j(\omega_n, \tau_k)e^{-i\omega_n\delta_j d_m} + V_m(\omega_n, \tau_k) \tag{2}$$

where $\tau_k$ is the window center and independently and identically distributed (iid.) zero mean Circularly Symmetric Complex Gaussian (CSCG) noise $V_n:=(V_1(\omega_n, \tau_k), \ldots, V_M(\omega_n, \tau_k))^T$ was added to model measurement noise, windowing errors, and model uncertainties. One may compare (2) with Equations (30)-(31) in "S. Rickard, R. Balan, and J. Rosca. Real-time time-frequency based blind source separation. In *Proc. of International Conference on Independent Component Analysis and Signal Separation (ICA*2001), pages 651-656, 2001."

One goal is to estimate the directions $\delta:=(\delta_1, \ldots, \delta_J)^T$, where the number of sources J is known, based on all available measurements up to time $\tau_k$. No assumptions are made on source characteristics $S_n:=(S_1(\omega_n,\tau_k), \ldots, S_J(\omega_n,\tau_k))^T \in \mathbb{C}^J$ and noise variances.

Method Outline

First addressed is an estimation problem for each time-point $\tau_k$ independently and to construct a log-likelihood function for the directions $\delta_j$ as a weighted sum of log-likelihoods of all frequency bins $\omega_n$. A score factor will be used as weights to select frequency bins with pronounced directional characteristics, see further below In a second step, the problem of overfitting at frequencies where not all signals are active will be reduced by introducing a regularization scheme. A time dimension will be integrated and a (nonlinear) filtering problem will be posed, which will be solved using a Sequential Importance Resampling (SIR) particle filter.

Log-Likelihood

Under a model as defined by equation (2), the observations $X_n:=(X_1(\omega_n,\tau_k), \ldots, X_M(\omega_n,\tau_k))^T$ are iid. CSCG random variables if conditioned on $S_n$ and $\delta$, and the joint probability density function (pdf) of all M observations factorizes into the marginal ones. (See "R. G. Gallager. Circularly-symmetric gaussian random vectors. Class Notes, January 2008" for a review of CSCG random variables).

For the log-likelihood one then has $$J - \log p(X_n | S_n, \delta) \propto \sum_{m=1}^{M} \left| X_M - \sum_{j=1}^{J} S_j e^{-i\omega_n\delta_j d_m} \right|^2 =: L_n(\delta, S_n) \tag{3}$$

where the t-f index $(\omega_n,\tau_k)$ has been dropped from $X_m(\omega_n,\tau_k)$ and $S_j(\omega_n,\tau_4)$. The negative log-likelihood function is used according to the cost function framework described below. If only a single frequency is considered, an ML-estimate for $\delta$ and $S_n$ can be obtained by minimizing the sum (cost function $L_n$). A high number J of degrees of freedom can lead to overfitting if the sample size M is small. The parameters $\delta_j$ are shared throughout all frequencies and their ML estimates can be found by solving a global optimization problem, which combines all frequencies—or equivalently by maximizing the joint likelihood of all frequencies. A global log-likelihood function is obtained by summation over the log-likelihoods of each frequency, because all noise terms are assumed to be iid.:

$$L(\delta, S_1, \ldots, S_N) = \sum_{n=1}^{N} L_n(\delta, S_n) \quad (4)$$

Uncovering the Signals

The approach discussed above faces a problem that comes twofold: not all sources are active on all frequencies. First, there may be frequencies on which no source is active but a high amount of energy is received nonetheless. This can be due to microphone characteristics or, considering the small sample size M, be caused by outliers. One intent is to discard frequency bins on which no signals are present. Second, if signal energies differ significantly or if not all sources are active on a given frequency, the small sampling size is prone to overfitting and the algorithm may deliver misleading results. On such frequencies, the use of all J available degrees of freedom in estimating the source signals is restrained by introducing a regularization scheme.

Both modifications of the likelihood, rejection of frequency bins and regularization, build on a factor $c^{opt}$ which is defined as the maximal amount of received energy that can be explained by a source at direction $\delta$. Now defined is an energy reduction that is achieved by a fixed angle/signal pair $(\delta, S)$, $$c(\omega, \delta, S) = 1 - \frac{\sum_{m=1}^{M} |X_m - Se^{-i\omega\delta d_m}|^2}{\sum_{m=1}^{M} |X_m|^2} \quad (5)$$

This factor will be used later for the evaluation of the estimates. By maximizing over S, one obtains the maximal achievable reduction for a given direction $$c^{opt}(\omega, \delta) = \max_{S \in C} c(\omega, \delta, S) \quad (6)$$

This factor is related to the Bayes Factor used in model choice, weighing here the assumptions of a one-signal model with direction $\delta$ and a no-signal model. (See "C. P. Robert. *The Bayesian Choice*. Springer, 2nd edition, 2001" Chapter 7 for a review of model choice and Bayes Factors.) If $c^{opt}(\omega, \delta)$ is small, only little cost function reduction can be achieved for a direction $\delta$. Hence, this frequency bin is of limited help in estimating a source from that direction. On the other hand, if $c^{opt}(\omega, \delta)$ is close to 1 the measurements can be matched to a signal coming from direction $\delta$. In other words, it is likely that a signal is present and in the direction $\delta$ and that this frequency can be of use for the estimation. However, care must be taken since some cost function reduction is possible even if no signals are present. In fact, the average percentage achievable cost function reduction under the assumption that no signal is present: i.e., $X_m = V_m$ ($H_0$ hypothesis) can be calculated to be $$E_{H_0}[c^{opt}(\omega, \delta)] = E\left[\max_{S \in C}\left(1 - \frac{1}{\sum_{m=1}^{M} |V_m|^2} \sum_{m=1}^{M} |V_m - Se^{-i\omega\delta d_m}|^2\right)\right] = \frac{1}{M} \quad (8)$$

It is quickly verified that $$S = \frac{1}{M} \sum_{m=1}^{M} W_m$$

with $W_m = V_m e^{i\omega\delta d_m}$, solves this MMSE problem. Hence, using the independence of $W_m$:

$$E\left[\max_{S \in C}\left(1 - \frac{1}{\sum_{m=1}^{M} |V_m|^2} \sum_{m=1}^{M} |V_m - Se^{-i\omega\delta d_m}|^2\right)\right] =$$

$$E\left[\left(1 - \frac{1}{\sum_{m=1}^{M} |W_m|^2} \sum_{m=1}^{M} \left|W_m - \frac{1}{M}\sum_{m'=1}^{M} W_{m'}\right|^2\right)\right] =$$

$$E\left[\left(1 - \frac{1}{\sum_{m=1}^{M} |W_m|^2} \sum_{m=1}^{M} \left(W_m^* W_m - \frac{1}{M} W_m^* \sum_{m'=1}^{M} W_{m'} - \right.\right.\right.$$

$$\left.\left.\left. \frac{1}{M} W_m \sum_{m'=1}^{M} W_{m'}^* + \frac{1}{M^2} \sum_{m'=1}^{M} \sum_{m''=1}^{M} W_{m'}^* W_{m''}\right)\right)\right] =$$

$$E\left[\left(1 - \frac{1}{\sum_{m=1}^{M} |W_m|^2} \sum_{m=1}^{M} \left(W_m^* W_m - \frac{1}{M} W_m^* W_m\right)\right)\right] =$$

$$E\left[1 - \left(1 - \frac{1}{M}\right)\right] = \frac{1}{M}$$

Regularized Log-Likelihood

The percentage achievable cost function reduction factors are now used to create a regularized log-likelihood function. One intent is to address the problem of large signal energy disparities: high-energy frequency bins have a large influence on the global likelihood function and will affect direction estimates of all signals, even if only a single signal is present at that frequency. To mitigate these undesired cross-influences, a penalty $\lambda(\omega_n, \delta_j)$ for the signal powers $|S_j(\omega_n, \tau_k)|^2$ $$\lambda(\omega_n, \delta_j) = \alpha\left(\max_{j'} c^{opt}(\omega_n, \delta_{j'}) - c^{opt}(\omega_n, \delta_j)\right) \quad (9)$$

where $\alpha > 0$ is a design parameter that can be adapted to the problem. In doing so one favors directions that have a high percentage achievable cost function reduction towards directions that do not and this has proven to work well in cases where signals have dissimilar fingerprints in the frequency domain.

Adding this penalty to the log-likelihood (3) yields the regularized (negative) log-likelihood $$L_n^{reg}(\delta, S_n) = L_n(\delta, S_n) + \sum_{j=1}^{J} \lambda(\omega_n, \delta_j)|S_j(\omega_n, \tau_k)|^2 \quad (10)$$

From a statistical viewpoint, the regularization can also be understood as using a non-flat exponential prior for the signal powers; i.e., $$p(|S_j(\omega_n,\tau_k)|^2) = \lambda(\omega_n,\delta_j)e^{-\lambda(\omega_n,\delta_j)|S_j(\omega_n,\tau_k)|^2} 1_{[0,\infty)}(|S_j(\omega_n,\tau_k)|^2) \quad (11)$$

and the regularized log-likelihood as posterior density for $S_n$ conditioned on $\delta$. Here, $1_{[0,\infty)}$ is the indicator function of $[0,\infty)$.

Global Log-Likelihood

Next, a global log-likelihood or cost function for $\delta$ and $S_1, \ldots, S_N$ will be provided, which is the main building block for the estimator. Equation (4) will be modified to include the $c^{opt}$ factors from above as weighting factors $w(\omega_n, \tau_k)$, $$\hat{w}(\omega_n, \tau_k, \delta) = \sum_{j=1}^{J} c^{opt}(\omega_n, \delta_j) \quad (12)$$

$$w(\omega_n, \tau_k, \delta) = \frac{\hat{w}(\omega_n, \tau_k, \delta)}{\sum_{n=1}^{N} \hat{w}(\omega_n, \tau_k, \delta)} \quad (13)$$

Combining these weights with the regularized log-likelihoods for each frequency yields the global log-likelihood $$L(\delta, S_1, \ldots, S_N) = \sum_{n=1}^{N} w(\omega_n, \tau_k, \delta) L_n^{reg}(\delta, S_n) \quad (14)$$

Direct minimization of this J+2NJ dimensional cost function is computationally prohibitive if real-time applications are in mind. However, for fixed $\delta$ each addend is a convex function of $S_n$ and a minimizer can be found explicitly (see below). The remainder is a superposition of sine functions of $\delta$ that are costly to evaluate, non-convex and possibly having multiple minima.

Particle Filter Implementation

In order to include the time dimension into the estimation procedure, a Markovian stochastic dynamic system is constructed; i.e., state equations $p(\delta_k, S_{1,k}, \ldots, S_{N,k}|S_{1,k-1}, \ldots, S_{N,k-1})$ for the estimation variables $\delta$ and $S_n$ where $k$ indexes time. It is first assumed that $\delta_k$ be independent of $S_{n,l}$ for all $n$, $k$, $l$ and then immediately drop $S_n$ from the system, because not any assumptions are made on the time structure of the source signals. Dropping $S_n$ from the system can be achieved formally by using $p(S_{1,k}, \ldots, S_{N,k}|S_{1,k-1}, \ldots, S_{N,k-1}) \propto 1$. This prior does not cause problems although it is not a real pdf because the likelihood is well-behaved.

A particle filter is used to obtain a discrete approximation of $p(\delta_k, S_{1,k}, \ldots, S_{N,k}|X_{1,0:k}, \ldots, X_{N,0:k})$, which uses all available data from time $\tau_0$ to $\tau_k$. The estimation of this pdf can then be used to obtain estimates of $\delta_k$ and $S_{1,k}, \ldots, S_{N,k}$. A particle filter iteratively updates $p(\delta_k, S_{1,k}, \ldots, S_{N,k}|X_{1,0:k}, \ldots, X_{N,0:k})$ as new measurements become available and a Sampling Importance Resampling (SIR) variant with resampling will be used only if the approximation becomes poor. An estimate of the effective number of particles is used as criterion. A tutorial overview on particle filters can be found in [1] S. Arulampalam, S. Maskell, N. Gordon, and T. Clapp. A tutorial on particle filters for on-line non-linear/non-gaussian bayesian tracking. *IEEE Transactions on Signal Processing*, 50: 174-188, 2001.

Transitions Kernels and Importance Sampling

The transition probabilities for the source locations serve two purposes: to describe the source dislocation and to search the state space for possible sources. It is assumed that source movements are independent and, therefore, use 1-dimensional random walks without drift for each state location; i.e., $$p(\delta_k | \delta_{k-1}) = \prod_{j=1}^{J} p(\delta_{j,k} | \delta_{j,k-1}) = \prod_{j=1}^{J} \mathcal{N}(\delta_{j,k-1}, \sigma^2) \quad (15)$$

where $N(\Xi,\sigma^2)$ is used to represent the pdf of a Gaussian random variable with mean $\mu$ and variance $\sigma^2$. A particle filter ideally samples from $p(\delta_k|\delta_{k-1}, X_k) \propto p(X_k|\delta_k)p(\delta_k|\delta_{k-1})$ to update its pdf estimate. However, this distribution is too difficult for sampling. Thus, importance sampling is employed with $p(\delta_k|\delta_{k-1})$ as importance density and $p(X_k|\delta_k)$ used to update the particle weights $$w_k^i = w_{k-1}^i \exp(-\gamma L^{reg}(\delta_k^i, S_{1,k}^i, \ldots, S_{N,k}^i)) \quad (16)$$

$\gamma > 0$ is a design parameter, which is connected to the measurement noise variance. Resampling takes place if the effective number of particles $$N_{eff} = \frac{1}{\sum_{i=1}^{N_{particles}} (w^i)^2}$$

drops below a threshold $N_{th}$.

Signal Estimates

As the signal transition kernels have been defined to be flat, no information is conveyed between time steps. Consequently, an ML estimator is used for the signals (or rather a MAP estimator if the regularization scheme is viewed as a prior). Even though no signal estimates are needed for localization, explicit estimates are intentionally used instead of marginalization to avoid costly J-dimensional complex integration. ML/MAP estimates can be obtained analytically thanks to the quadratic exponent of the Gaussian. One has $$L_n^{reg}(\delta, S_n) = \sum_{m=1}^{M} \left| X_m - \sum_{j=1}^{J} S_j e^{-i\omega\delta_j d_m} \right|^2 + \sum_{j=1}^{J} \lambda(\omega_n, \delta_j)|S_j|^2 = \quad (17)$$

$$\sum_{m=1}^{M} \left( |X_m|^2 + \sum_{j=1}^{J} \sum_{j'=1}^{J} S_j^* S_{j'} e^{-i\omega(\delta_{j'} - \delta_j)d_m} - \right.$$

$$\left. \sum_{j=1}^{J} (X_m^* S_j e^{-i\omega\delta_j d_m} + X_m S_j^* e^{i\omega\delta_j d_m}) \right) + \sum_{j=1}^{J} \lambda(\omega_n, \delta_j)|S_j|^2$$

Defining $$(H)_{ij} = \sum_{m=1}^{M} e^{-i\omega(\delta_j - \delta_i)d_m} \quad (18)$$

-continued $$(\Lambda)_{ij} \begin{cases} \lambda(\omega_n, \delta_i) & i = j \\ 0 & i \neq j \end{cases} \quad (19)$$

$$g_i = -\sum_{m=1}^{M} X_m e^{i\omega \delta_i d_m} \quad (20)$$

(17) can be rewritten in matrix-vector notation as $$L_n^{reg}(\delta, S_n) = X^H X + S^H (H+\Lambda)S + g^H S + S^H g \quad (21)$$

and a minimizer can be found to be $$\hat{S} = (H+\Lambda)^{-1} g \quad (22)$$

$L_n^{reg}(\delta, S_n)$ is clearly convex in S, hence the minimizer can be found by solving $\nabla L_n^{reg}(\delta, S) = 0$ where $\nabla L_n^{reg}(\delta, S)$ is the Wirthinger derivative of $L_n^{reg}(\delta, S)$ w.r.t. $S^H$; i.e., $\nabla L_n^{reg}(\delta, S) = (H+\Lambda)S + g = 0$.

The signal estimates can be used to update the particle weights using (16).

Estimate Evaluation

To improve interpretability of the particle filter result and for fine-tuning of the filter, the following evaluation scheme is provided in accordance with an aspect of the present invention. Each of the source locations $$\delta_j = \frac{1}{N_{particles}} \sum_{i=1}^{N_{particles}} \omega^i \delta_j^i$$

is assigned a score $c(\delta_j)$ that quantifies the belief that a signal is tracked at the correct location. The calculation of $c(\delta_j)$ follows that of $c^{opt}(\omega, \delta)$ in (6) and instead of finding the optimal signals for each direction $\delta_j$ the ML-estimates $\hat{S}$ from (22) are used. To concentrate on those frequencies that are relevant for the respective direction, the factors $c^{opt}(\omega, \delta_j)$ and the received energy $E(\omega_n, \tau_k)$ are used as weights κ in accordance with an aspect of the present invention. The $c(\delta_j)$ factors have to be calculated for each particle.

$$E(\omega_n, \tau_k) = \sum_{m=1}^{M} |X_m(\omega_n, \tau_k)| \quad (23)$$

$$\kappa_{n,j}^i = \frac{E(\omega_n, \tau_k) c^{opt}(\omega_n, \delta_j^i)}{\sum_{n=1}^{N} E(\omega_n, \tau_k) c^{opt}(\omega_n, \delta_j^i)} \quad (24)$$

$$c(\delta_j^i) = \sum_{n=1}^{N} \kappa_{n,j}^i c(\omega_n, \delta_j^i, S_j^i(\omega_n, \tau_n)) \quad (25)$$

$$c(\delta_j) = \frac{1}{N_{particles}} \sum_{i=1}^{N_{particles}} \omega^i c(\delta_j^i) \quad (26)$$

Modified Transition Kernels

To harmonize both purposes of the transition kernels $p(\delta_{j,k} | \delta_{j,k-1})$—state space search and source dislocation—, a transition variance $\sigma^2$ is used that depends on the evaluation measure described above. A small variance $\sigma^2$ is preferred when a source is being tracked and a large variance if this is not the case. Hence, the following expression is used to replace $\sigma^2$ in (15) and $\sigma_{max}^2$ as design parameter:

$$\sigma^2(\delta_{k-1}, S_{1,k-1}, \ldots, S_{N,k-1}) = (1-c(\delta_{j,k-1}))\sigma_{max}^2 \quad (27)$$

This will formally break the independence assumption was made on $S_n$ and δ.

Method Summary

Figure 2A:
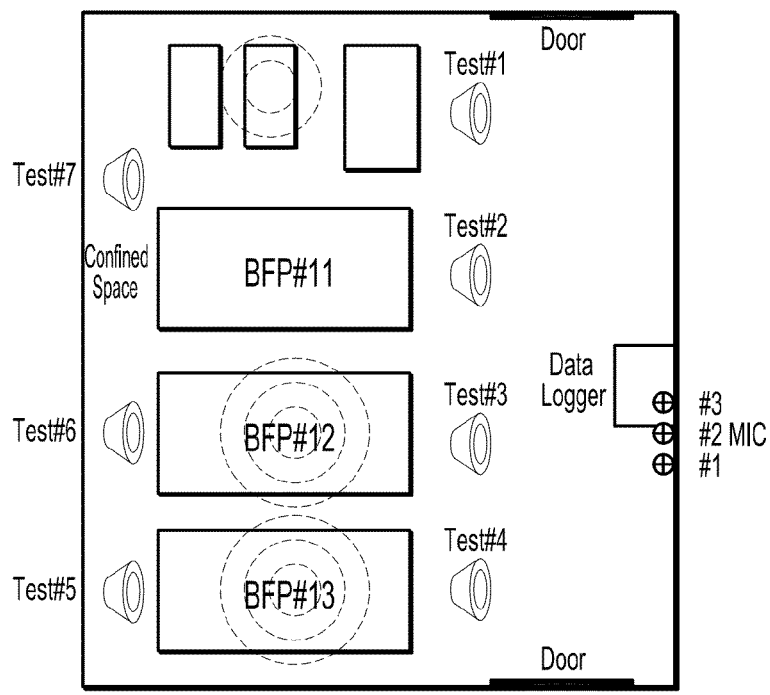
FIG. 2A illustrates in diagram a floor plan and FIG. 2B illustrates a recording setup in accordance with various aspects of the present invention.
Figure 2B:
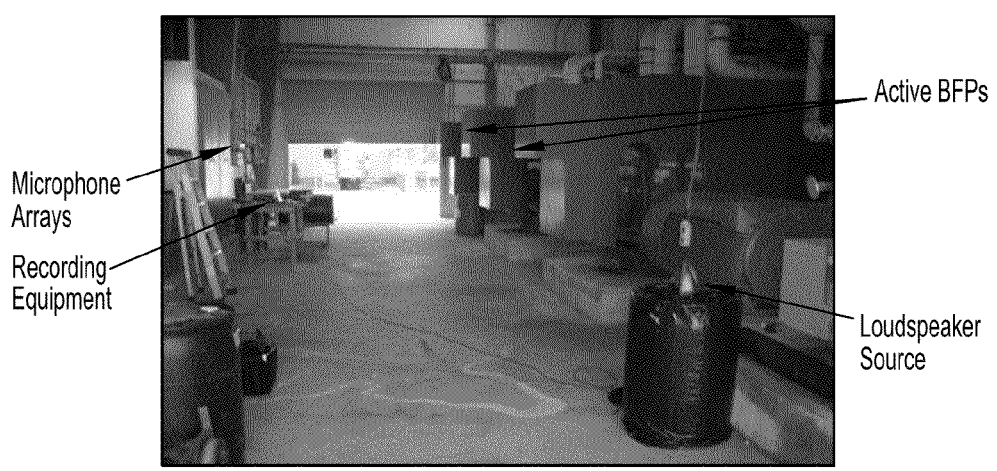
Figure 3A:
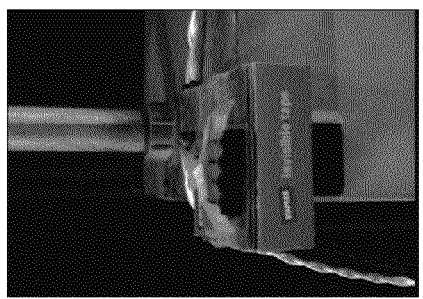
FIG. 3 illustrates devices applied in creating signals in accordance with an aspect of the present invention.
Figure 3B:
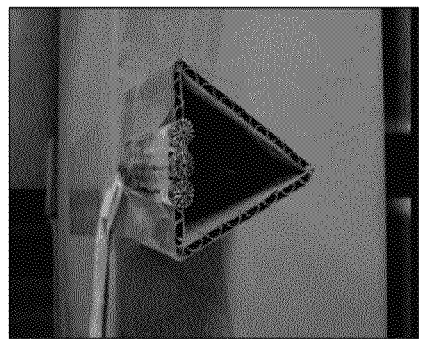
Figure 3C:
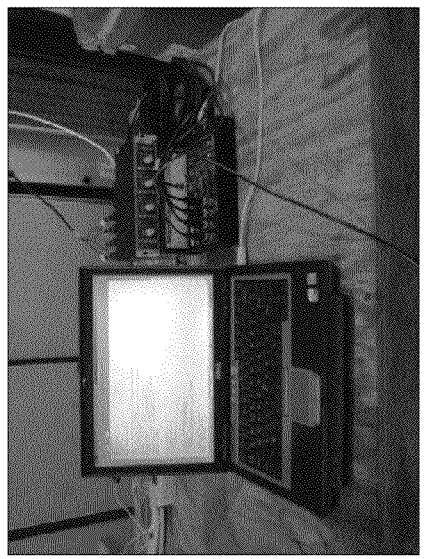
Figure 3D:
Figure 3E:
Figure 3F:
Figure 4A:
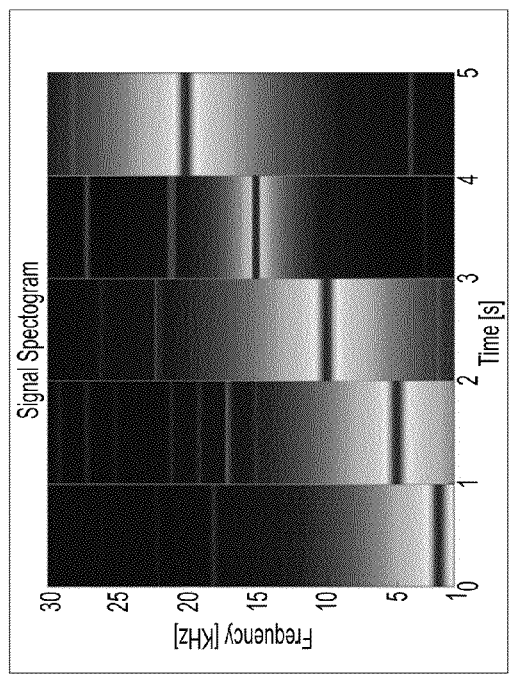
FIG. 4 illustrates signal properties in accordance with an aspect of the present invention.
Figure 4B:
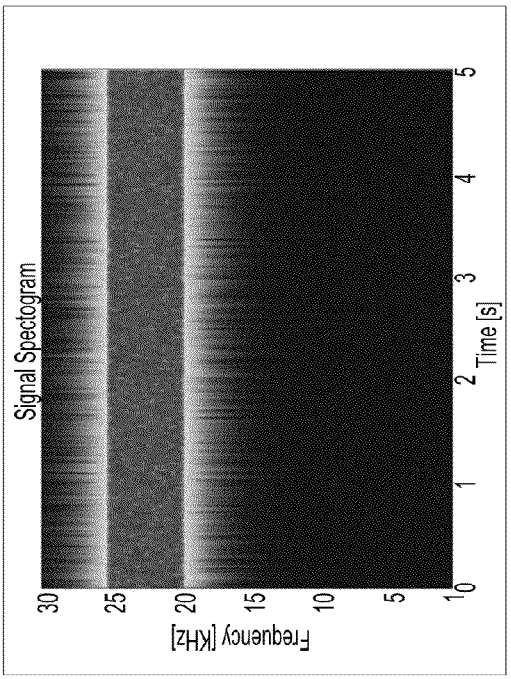
Figure 4C:
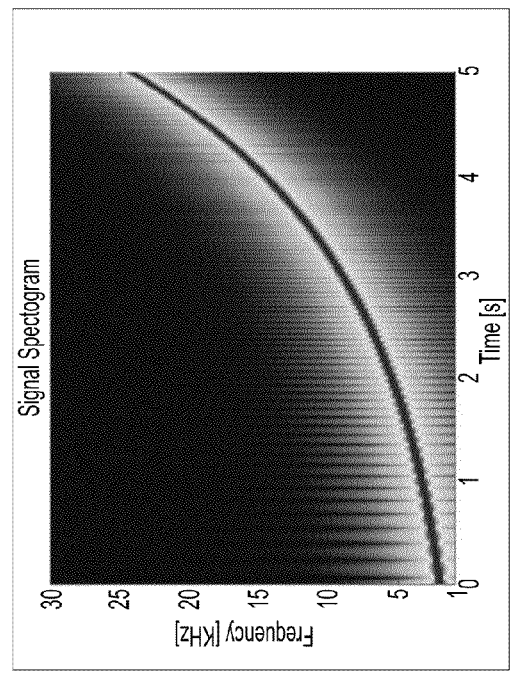
Figure 4D:
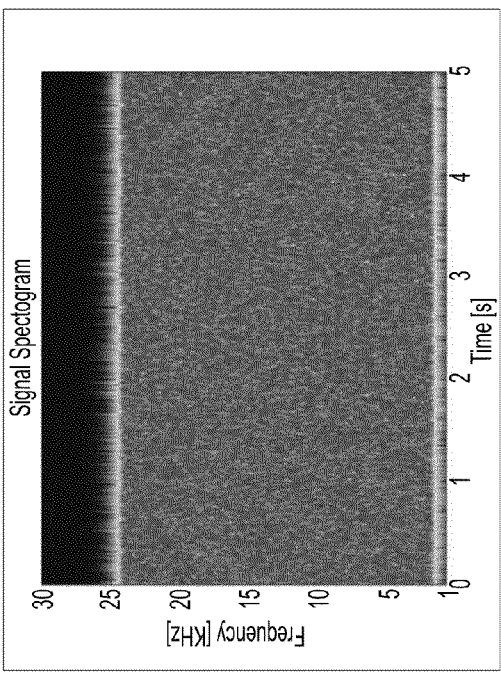

One method of localization provided in accordance with an aspect of the present invention can be described by the following steps:

Method 1:

Initialize particle states $\delta_{j,0}^i$ i = 1,..., $N_{particles}$, j = 1,..., J
• for k = 1, ., . do:
   - for i = 1, ... ,$N_{particles}$ do:
     * Generate proposals $\delta_{j,k}^i$ according to (15).
     * Calculate $c^{opt}(\omega_n, \delta_{j,k}^i)$ according to (6).
     * Calculate regularization factors $\lambda(\omega_n, \delta_{j,k}^i)$ according to (9).
     * Calculate signal ML/MAP estimates $\hat{S}_{n,k}^i$ according to (22).
     * Calculate likelihoods $L_n^{reg}(\delta^i, S_n^i)$ according to (3) and (10).
     * Calculate global likelihood $L^{reg}(\delta_k^i, S_{1,k}^i, \ldots, S_{N,k}^i)$ according to (14).
     * Calculate evaluation factors $c(\delta_{j,k}^i)$ according to (23).
     * Update particle weights $w^i$ according to (16).
   - end for
   - if $N_{eff} < N_{th}$
     * Resample particles.
   - end if
• end for Simulation Results The development of a method as provided herein in accordance with an aspect of the present invention was influenced by its performance on a real data set. However, before going into the real data the performance of the method in a controlled environment using artificially generated data is examined first. FIG. 2a illustrates in diagram a floor plan of a boiler feed pump (BFP) house in the field. The locations of the additive test sources and the microphones are shown as well as the activity of power equipment e.g., BFP#12 and BFP#13. FIG. 2b shows a recording setup #1 with a loudspeaker source. Equipment is pointed out by arrows. The two BFPs in the back of the room are active and generate high broadband noise.

Artificial Data

To probe the method under ideal conditions; i.e., in accordance with a system model that is provided in accordance with an aspect of the present invention, we two test scenarios have been generated. For the first scenario two different mixtures of deterministic sine signals are used as sources. The signals partially overlap in the frequency domain. The source locations are varying over time and intersect in the second half of the simulation. Three different signal to noise ratios are used. The second scenario is composed of three sources that emit the same signal, which is again a deterministic mixture of sines. Here, the sources are slowly moving but do not cross.

Discussion of Results

The method succeeds in separating signals of similar powers even if noise was added to the microphones. However, in case of a signal to signal ratio of 2 the estimates of the weak signal are affected. If the signal to signal ratio is further increased no valid results can be obtained.

Real World Measurements

Test recordings were performed and this data was used to evaluate the above method on application relevant data from the field. In the following the recorded data and the performance of the current localization method will be discussed. The recordings were taken in a boiler feed pump house with two different microphone arrays. The first array consists of three nonlinearly spaced ultrasonic microphones (4 Hz-80 kHz). The spacing between the centers of the microphones is 7 mm and 8 mm, respectively. The second array uses 4 linearly spaced microphones (40 Hz-16 kHz) with 7 mm spacing between the centers of neighboring units. Different sound signals are generated at seven locations close to the power equipment to simulate out-of-normal emissions. The setup of the experiment is illustrated in FIG. 2a. Note that BFP#12, #13 and some of the auxiliary equipment is running during all experiments and is generating intense background noise. The recording scenario is further clarified by FIG. 2b. Here, the recording setup of test location 1 is shown with a loudspeaker source.

FIG. 3 provides a view of the various recording equipment used in the experiments (top row). Moreover, FIG. 3 also illustrates the different sources that are employed in the recordings. A number of repeatable artificial signals with defined properties are emitted using the loudspeakers. These test signals are a chirp, a set of sinus signals at different frequencies, broad band white noise, high frequency noise and recorded noise from a damaged engine. The time-frequency representations of the first four test signals are illustrated in FIG. 4. The engine-defect signal was not used in the analysis due to the limited frequency range. A circular saw and a hammer impact on a metal tube were used to generate high energy signals additional to the loudspeakers. The reason for adding sources despite the repeatable loudspeaker signals is that the high background noise intensity resulted in inaudibility of some of the test signals. The different test recordings are listed in Table 1. Note that the circular saw was only used with the PSC microphone array as its emissions were only barely audible in this loud environment.

Overall, 95 experiments were performed resulting in 1.65 GB of acoustic data. One focus is on a subset of these recordings due to their large number and the limited gain in information by an exhaustive evaluation. Results are presented below for the sine signal and different test locations. Results for used signal types on test location 2 are also provided.

Source Localization Results

In the following, results for the experiments with sinusoidal signals and different test locations are presented. The sine test signal was selected, because it has the highest signal to noise ratio (SNR). Experiment results are documented in FIGS. 5-20 and will be summarized below. Each of these figures shows in a curve the particle filter result. The marker curve indicates the score function values $c(\delta_j)$ described earlier. The spectrogram of the received mixture signal is displayed also in the result figure. Also the estimated spectrograms of the tracked signals will be shown. Note that the different test locations are illustrated in FIG. 2a. FIG. 4 shows time-frequency plots of test signals: (a) chirp test signal, (b) sine signals at different frequencies, (c) broadband noise, and (d) narrow-band high-frequency noise.

Discussion of Results

The first four sources were located in front of the machines at angles of approximately −60, −50, −5, and 40 degrees as indicated by the dashed lines in the result figures. Locations 2 and 3 are closest to the microphone array and achieve the highest SNR; therefore leading to the most accurate results. The loudspeakers produce the clearest signal at 10 kHz between seconds 2 and 3. During this time interval, the signal can be located correctly at locations 1-3. Some of the sine signals at 2, 5, 15, and 20 kHz are detected at locations 2 and 3. Being closest to the microphone array, location 3 is detected correctly during the whole signal duration. In addition to the small distance, one of the active machines (BFP#12) is placed behind location 3, which facilitates signal detection. Throughout all recordings, BFP#13 is detected consistently at approximately 60 degrees. Locations 5-7 are behind the machines and the SNR at the microphone array is too low for the method provided herein to detect the appropriate signals.

A summary of experiment with two microphone arrays is provided in the following Table 1.

TABLE 1

| | Position | Signal Types | Number of Recordings |
|---|---|---|---|
| Ultrasonic Microphone Array | 1, 2, 3, 4, 5, 6, 7 | Chirp, sine tones, white noise, high freq. noise, defect engine noise | 35 |
| | | Hammer on metal | 7 |
| | — | Normal operation (BFP#11 & BFP#13) | 1 |
| PSC Microphone Array | 1, 2, 3, 4, 5, 6, 7 | Chirp, sine tones, white noise, high freq. noise, defect engine noise | 35 |
| | | Circular saw, hammer on metal | 14 |
| | — | Normal operation (BFP#12 & BFP#13) | 1 |
| | | Normal operation (BFP#11 & BFP#13) | 1 |
| | | Switch from BFP#12 to BFP#11 | 1 |

The following provides an overview of results using the provided method based on different signals.

Simulation Results with Artificial Data

Figure 5:
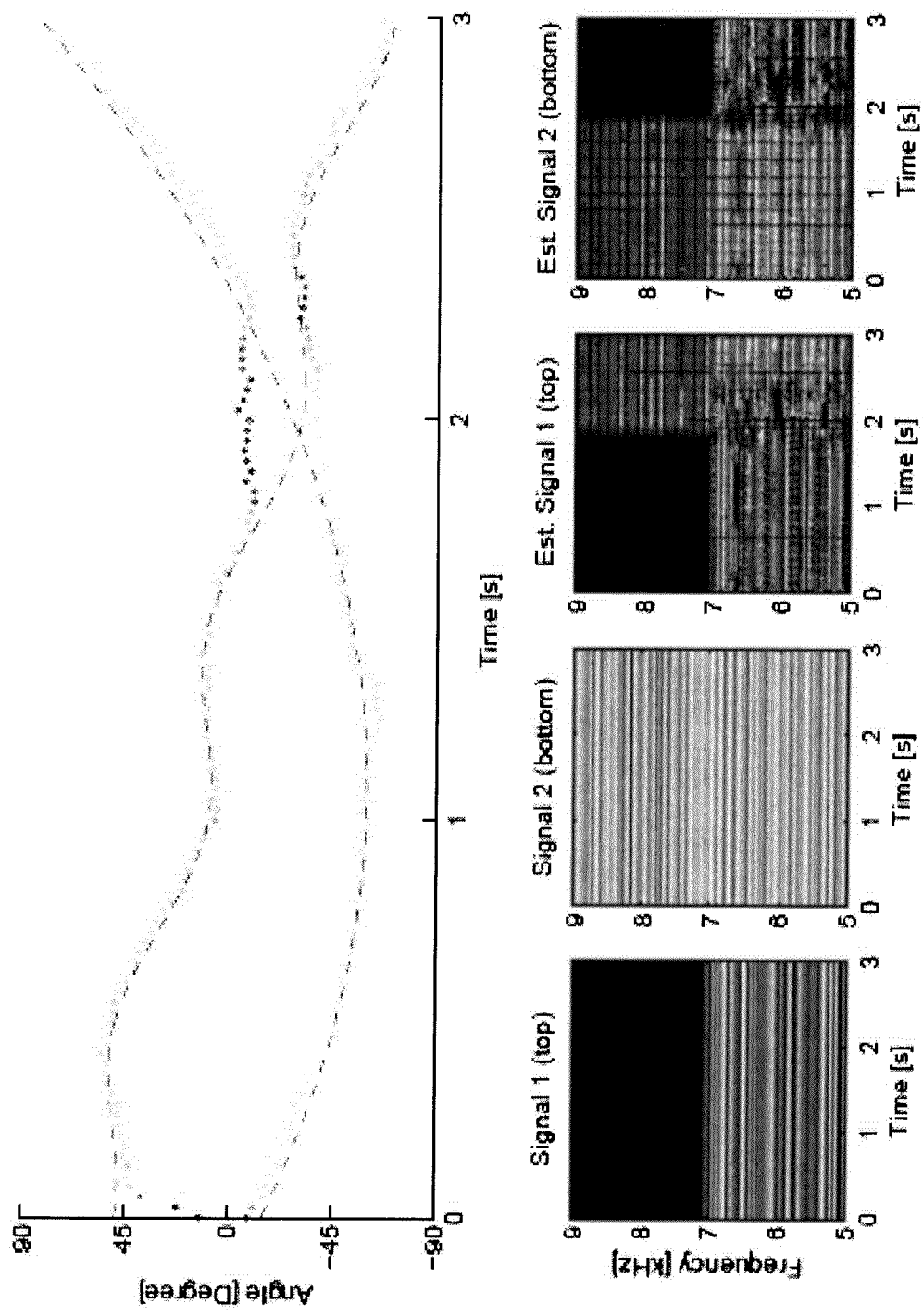
FIGS. 5-20 illustrate results in accordance with an aspect of the present invention.

FIG. 5: Simulation with two sources using different combinations of sine signals (bottom left). Particle filter result curve with dashed lines indicating the true source positions (dashed line) and curves for the estimation result (top) as well as estimated signals (bottom right).

Figure 6:
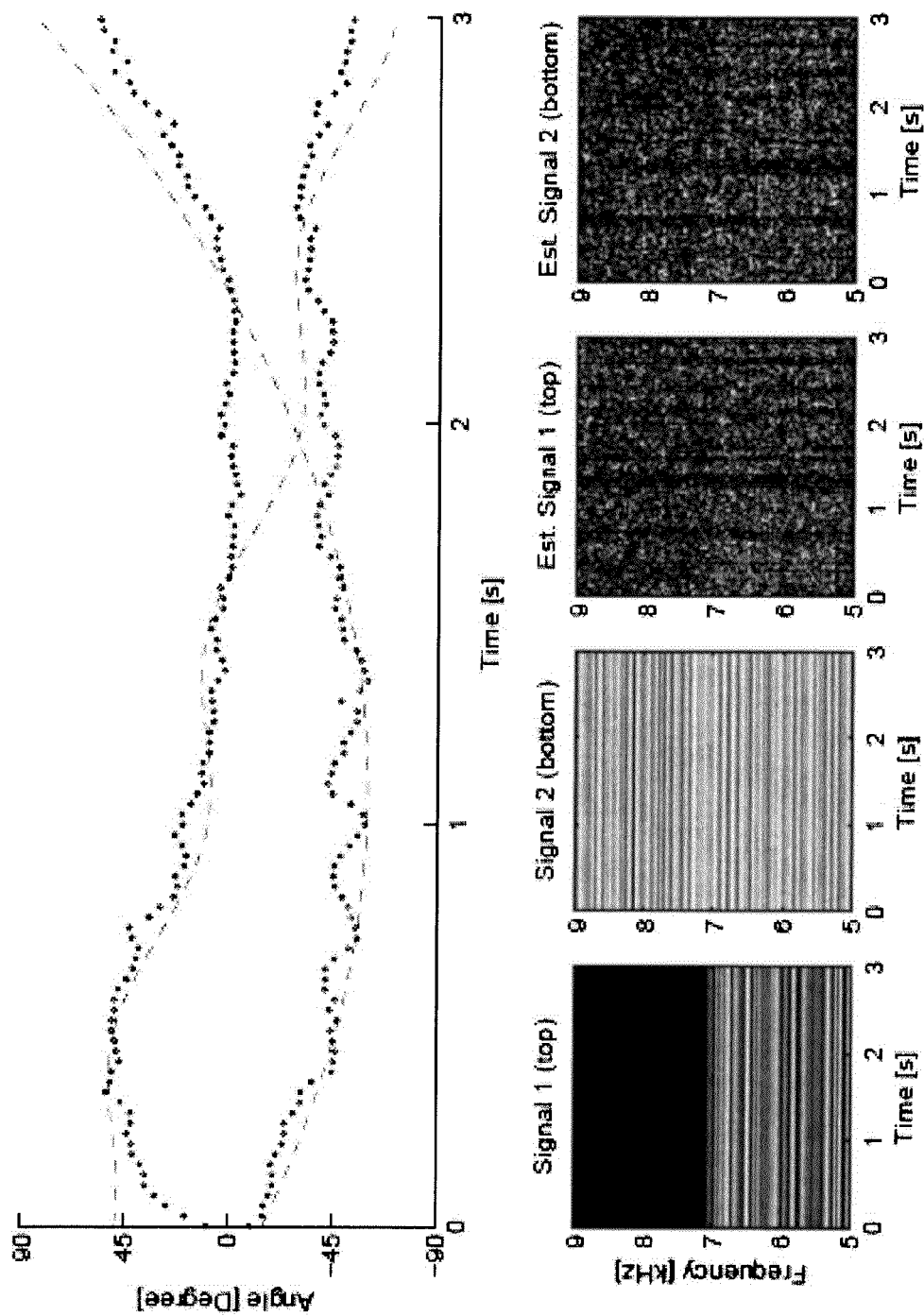

FIG. 6: Simulation with two sources using different combinations of sine signals (bottom left) and additive noise with $$\frac{P_{noise}}{P_{signal1}} = \frac{P_{noise}}{P_{signal2}} = 10$$

at all microphones. Particle filter result indicating the true source positions (dashed line) and the estimation result (top) as well as estimated signals (bottom right).

Figure 7:
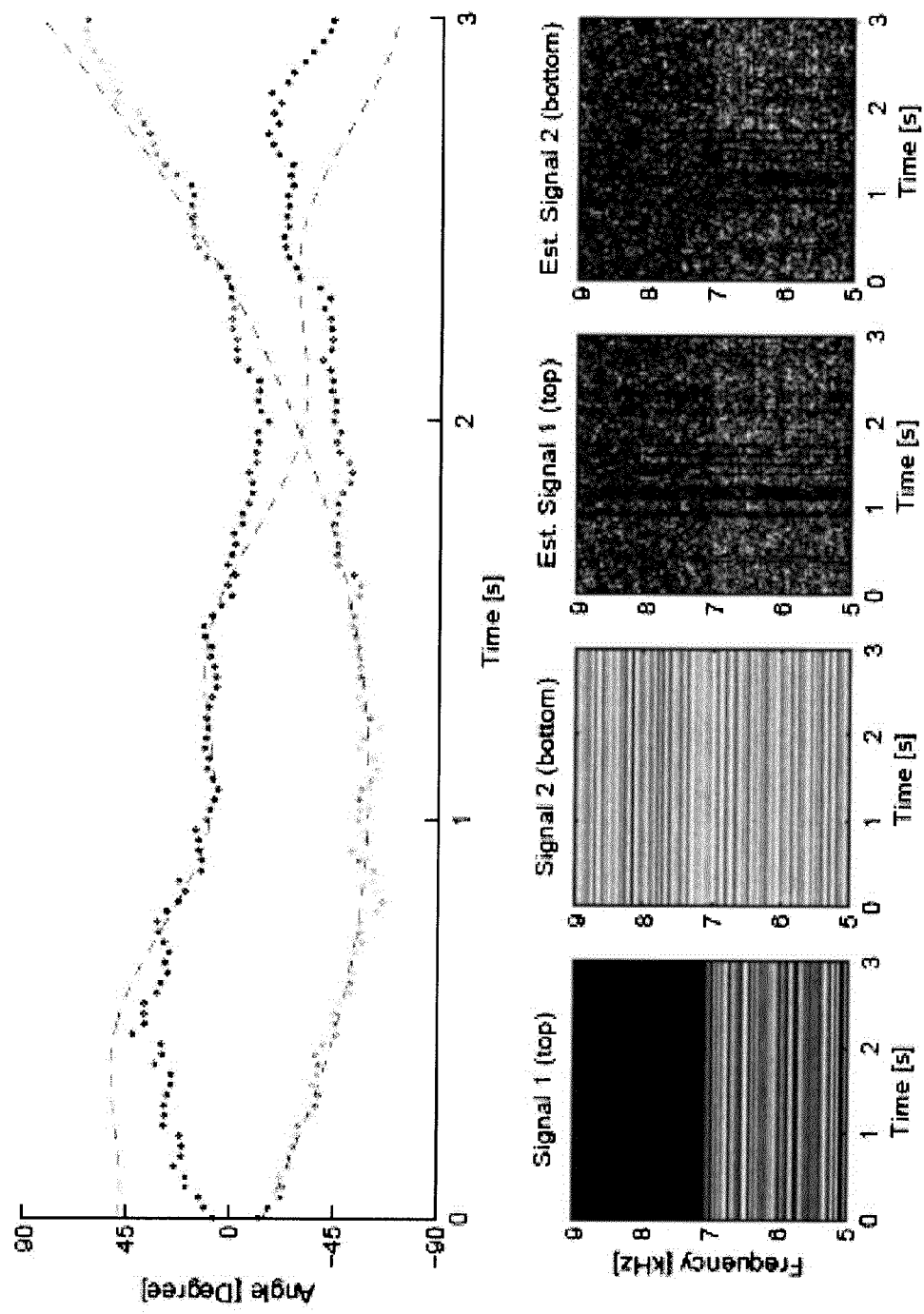

FIG. 7: Simulation with two sources using different combinations of sine signals (bottom left) and additive noise with $$\frac{P_{noise}}{P_{signal1}} = 10 \text{ and } \frac{P_{noise}}{P_{signal2}} = 5$$

at all microphones. Particle filter result with the true source positions and the estimation result (top) as well as estimated signals (bottom right).

Figure 8:
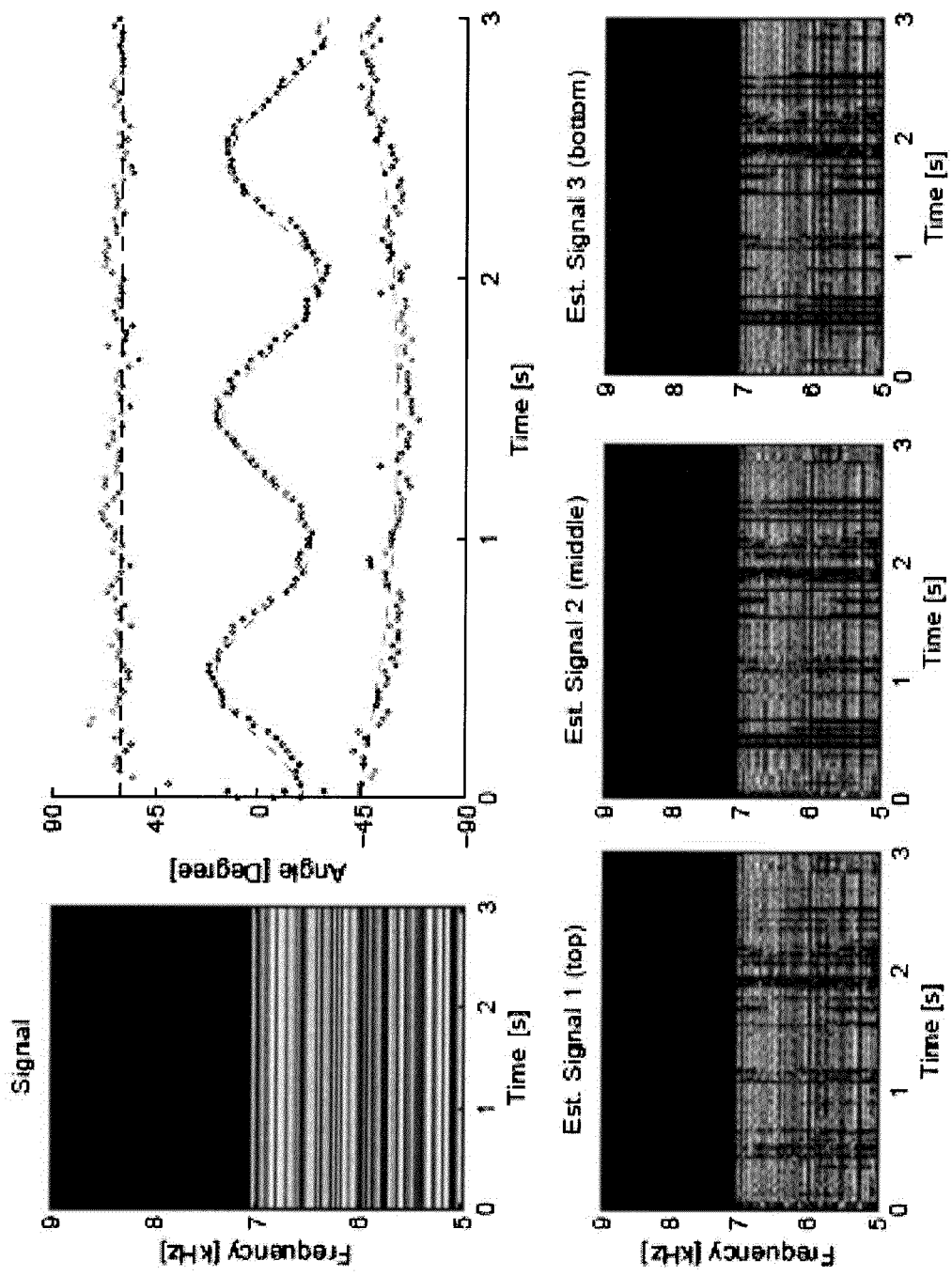

FIG. 8: Simulation with three sources using the same sine signal (top left). Particle filter result indicating the true source positions (dashed line) and the estimation result (top right) as well as estimated signals (bottom).

Results for Recordings with Sine Signals

Figure 9:
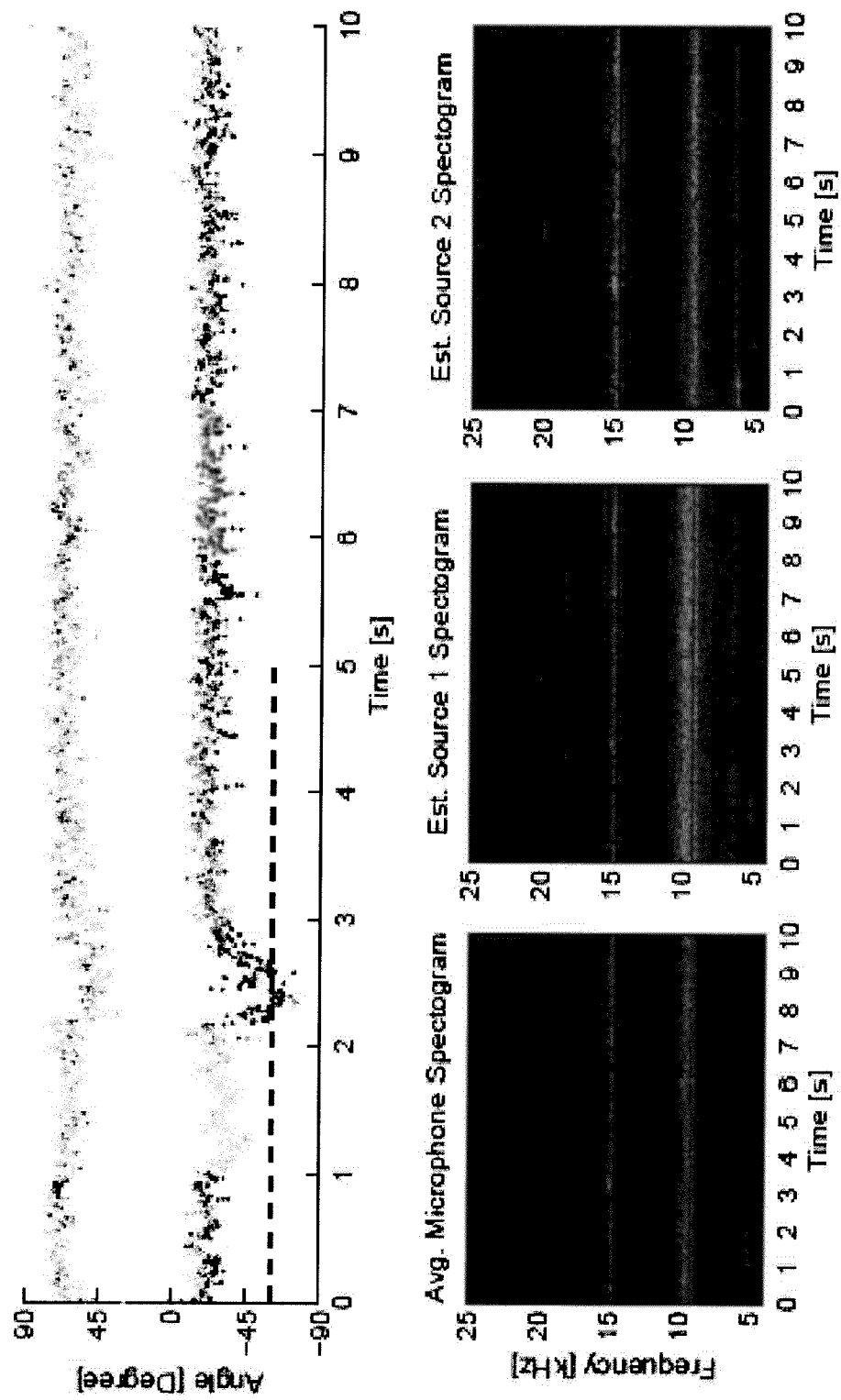

FIG. 9: Test location 1, sine signal. Particle filter results indicating the true source (dashed line) and the estimation result (top). Mean spectrogram of measurements (bottom left) and estimated spectrograms of first and second source on linear scale (bottom center and right).

Figure 10:
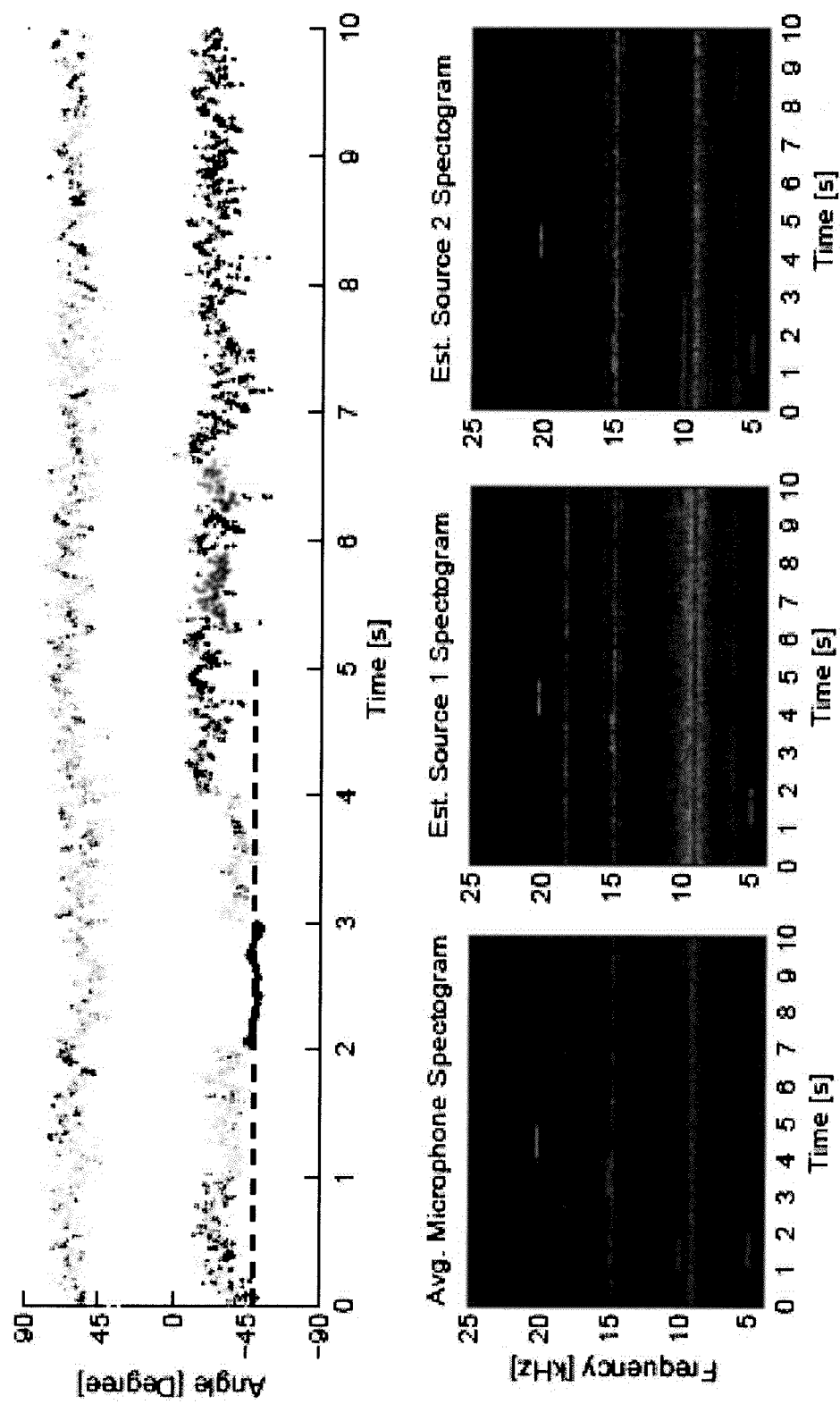

FIG. 10: Test location 2, sine signal. Particle filter results indicating the true source position (dashed line) and the estimation result (top). Mean spectrogram of measurements (bottom left) and estimated spectrograms of first and second source on linear scale (bottom center and right).

Figure 11:
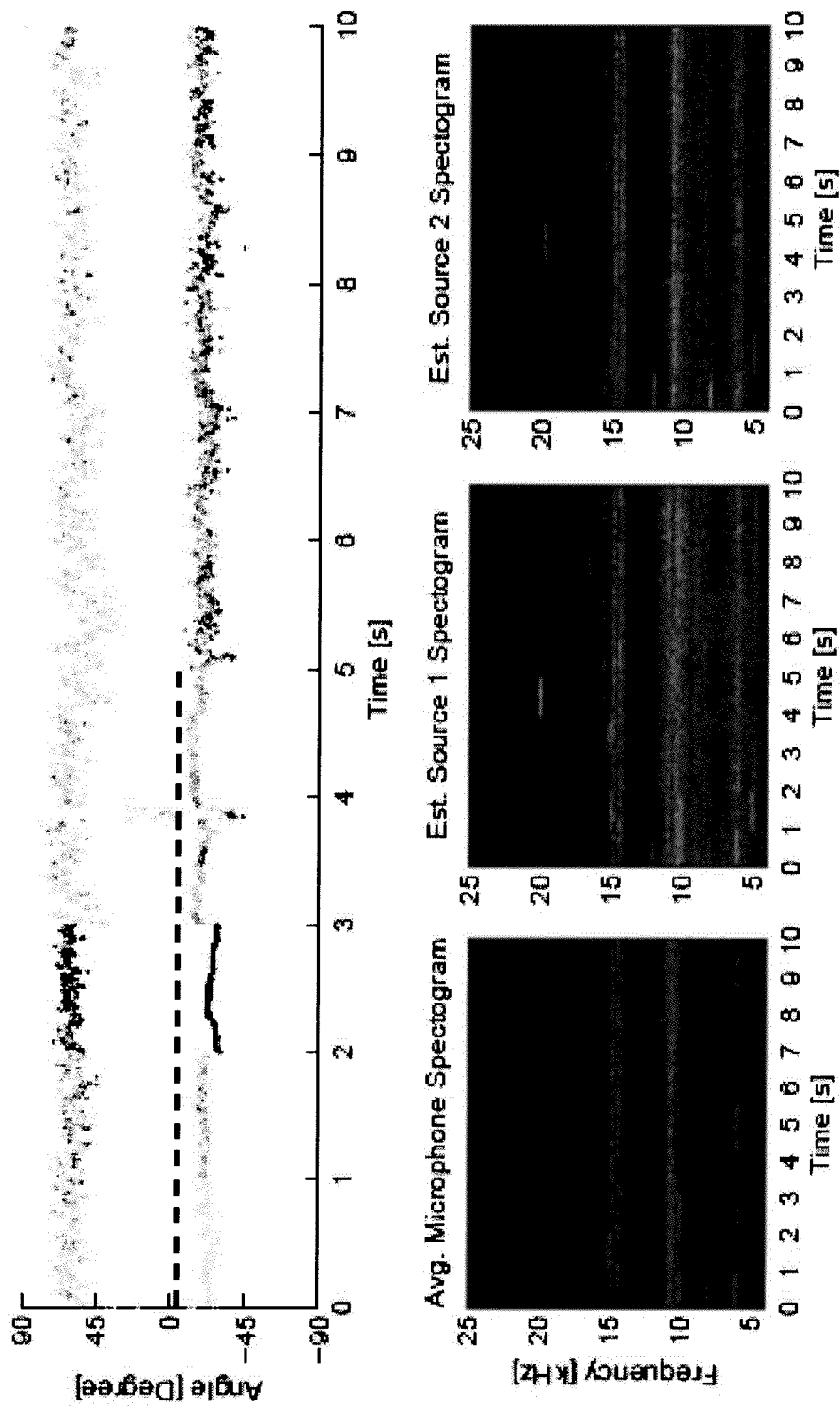

FIG. 11: Test location 3, sine signal. Particle filter results indicating the true source position (dashed line) and the estimation result (top). Mean spectrogram of measurements (bottom left) and estimated spectrograms of first and second source on linear scale (bottom center and right).

Figure 12:
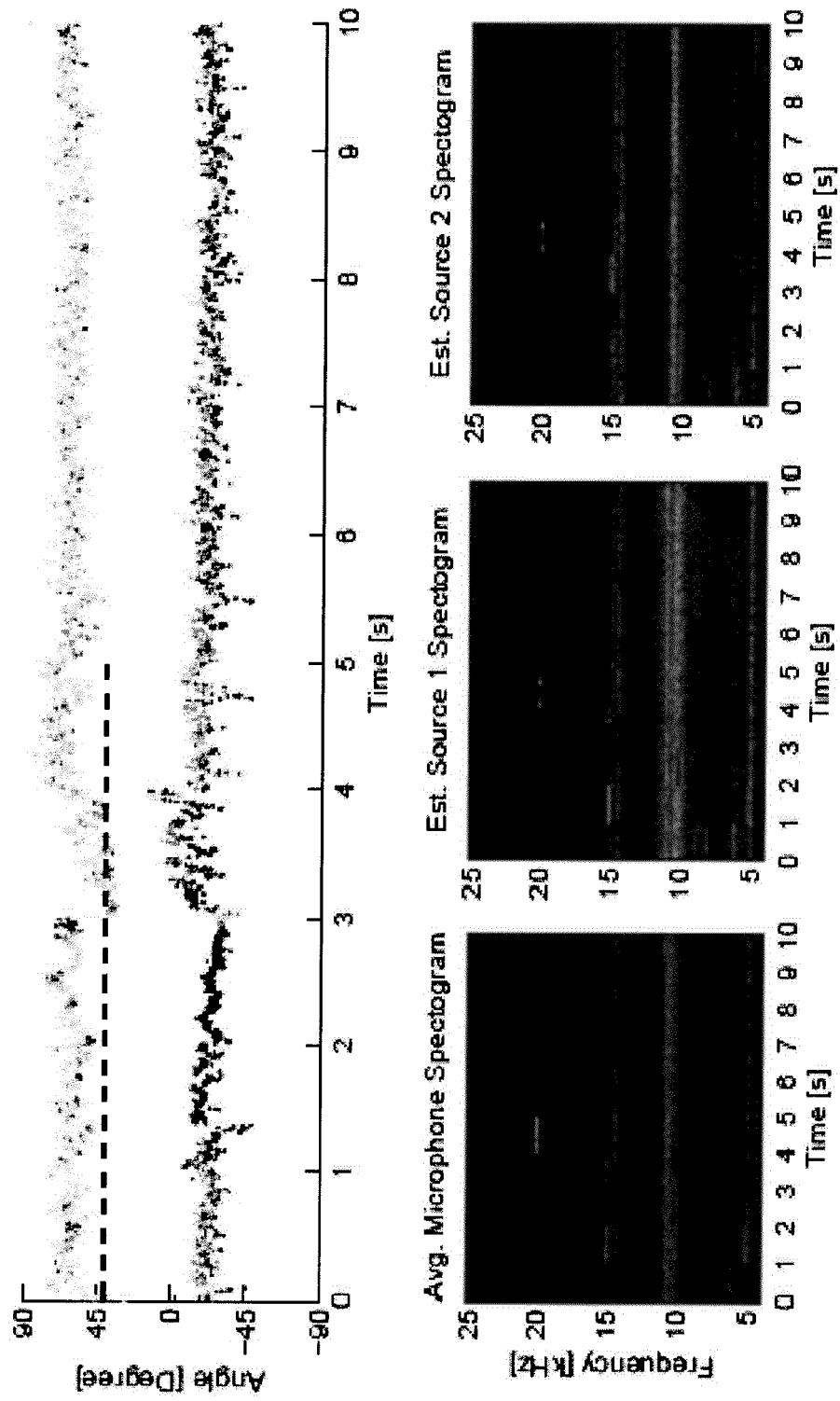

FIG. 12: Test location 4, sine signal. Particle filter results indicating the true source position (dashed line) and circles for the estimation result (top). Mean spectrogram of measurements (bottom left) and estimated spectrograms of first and second source on linear scale (bottom center and right).

Figure 13:
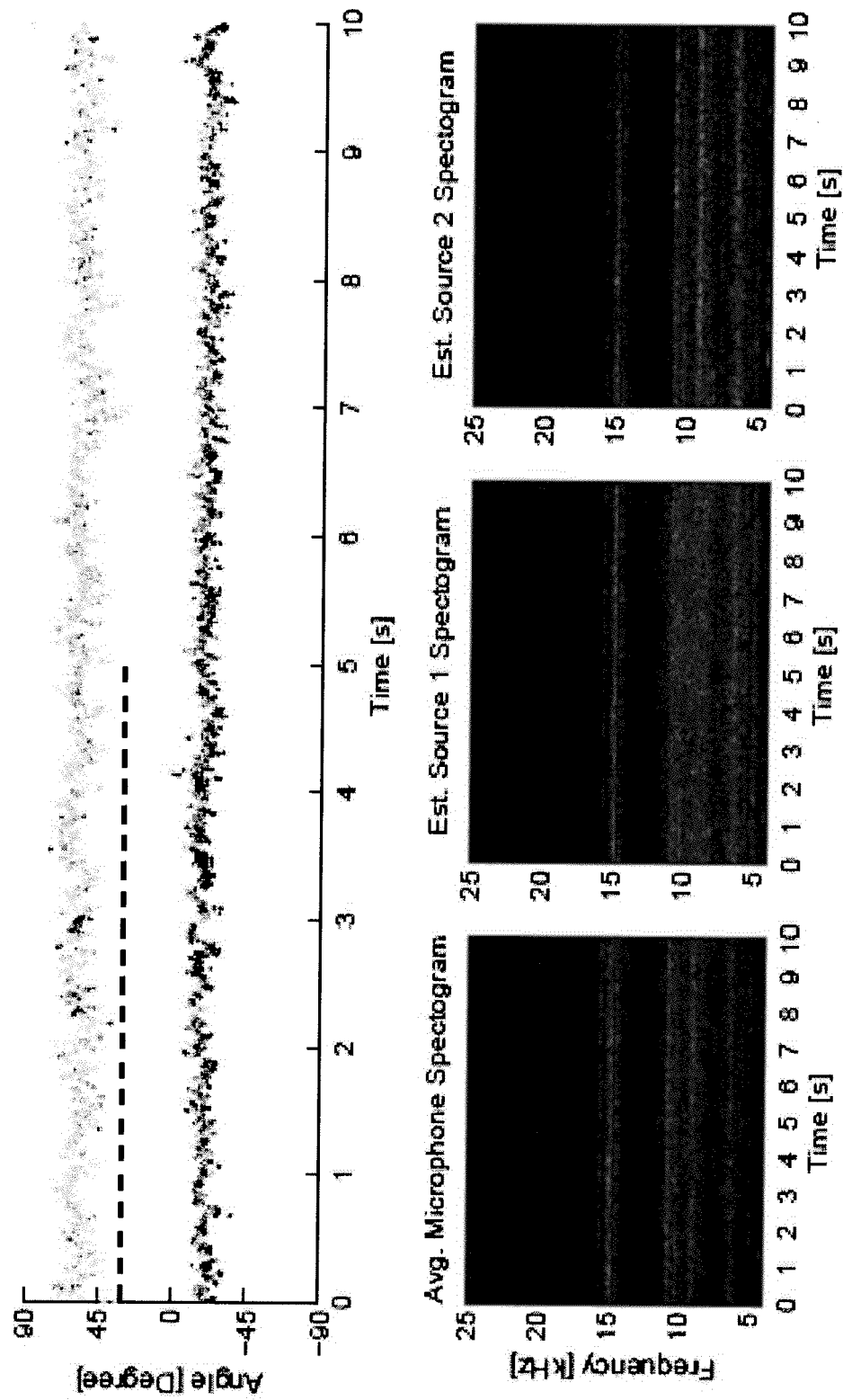

FIG. 13: Test location 5, sine signal. Particle filter results indicating the true source position (dashed line) and circles for the estimation result (top). Mean spectrogram of measurements (bottom left) and estimated spectrograms of first and second source on linear scale (bottom center and right).

Figure 14:
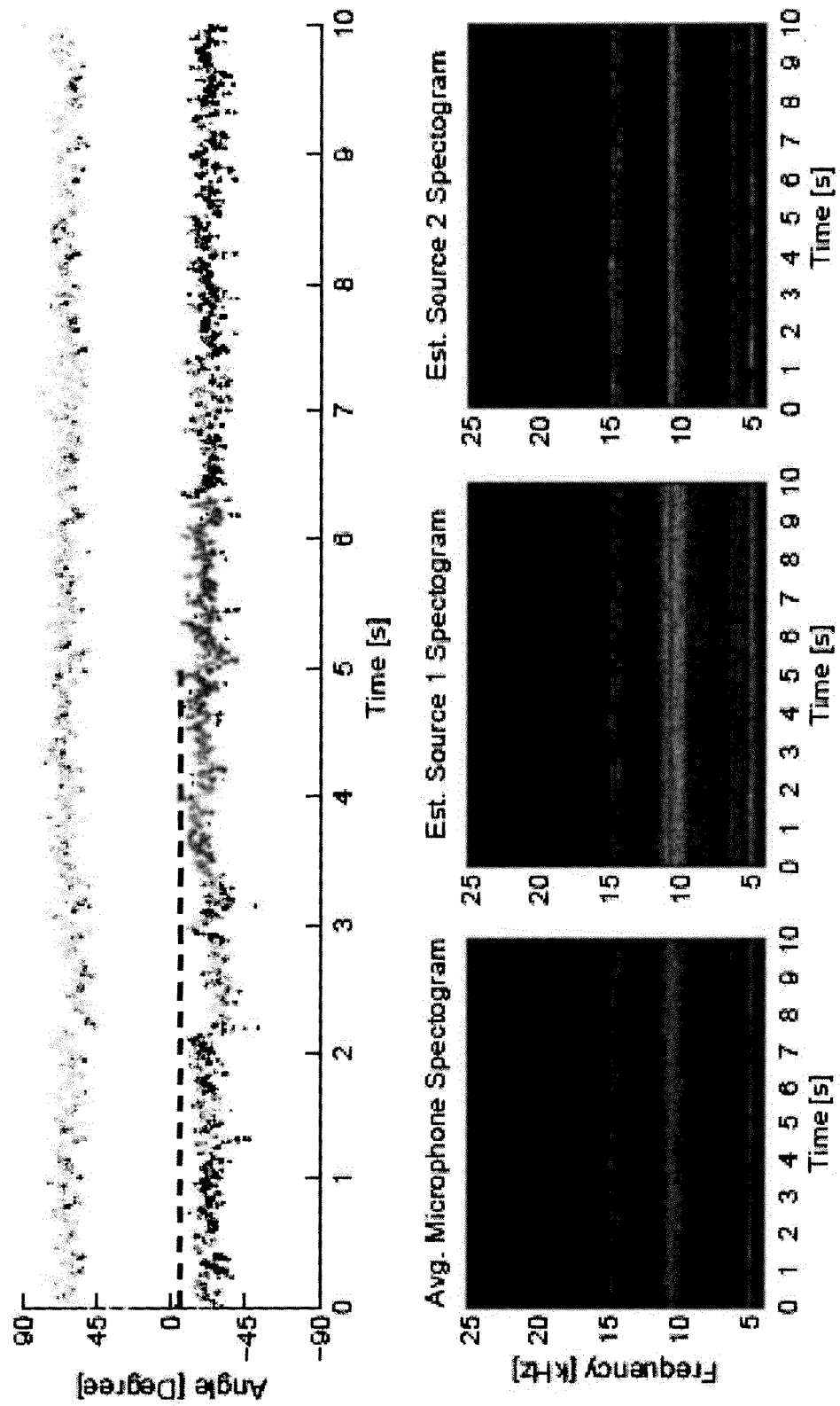

FIG. 14: Test location 6, sine signal. Particle filter results indicating the true source position (dashed line) and the estimation result (top). Mean spectrogram of measurements (bottom left) and estimated spectrograms of first and second source on linear scale (bottom center and right).

Figure 15:
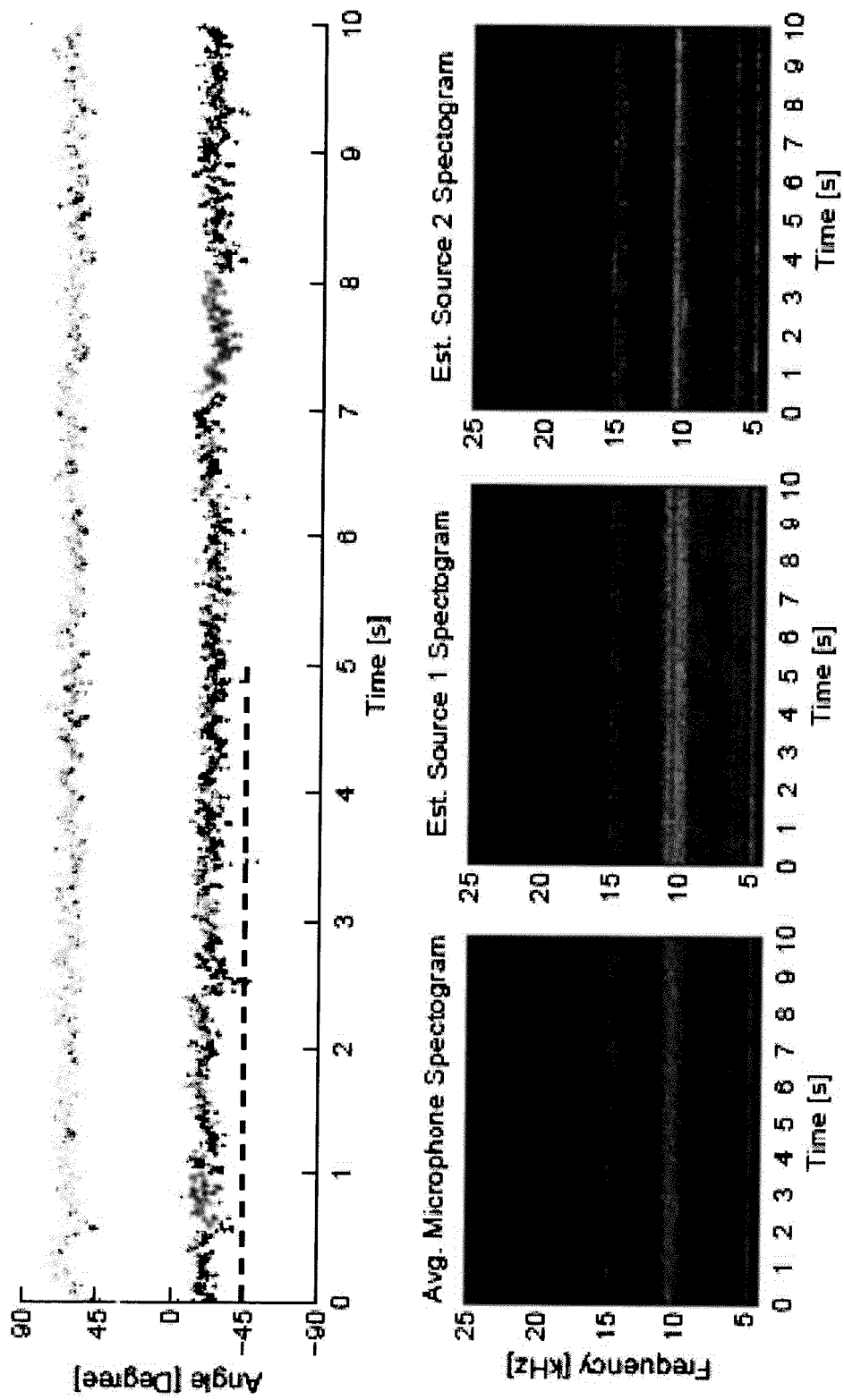

FIG. 15: Test location 7, sine signal. Particle filter results indicating the true source position (dashed line) and the estimation result (top). Mean spectrogram of measurements (bottom left) and estimated spectrograms of first and second source on linear scale (bottom center and right).

Results for Recordings with Different Signal Types

Figure 16:
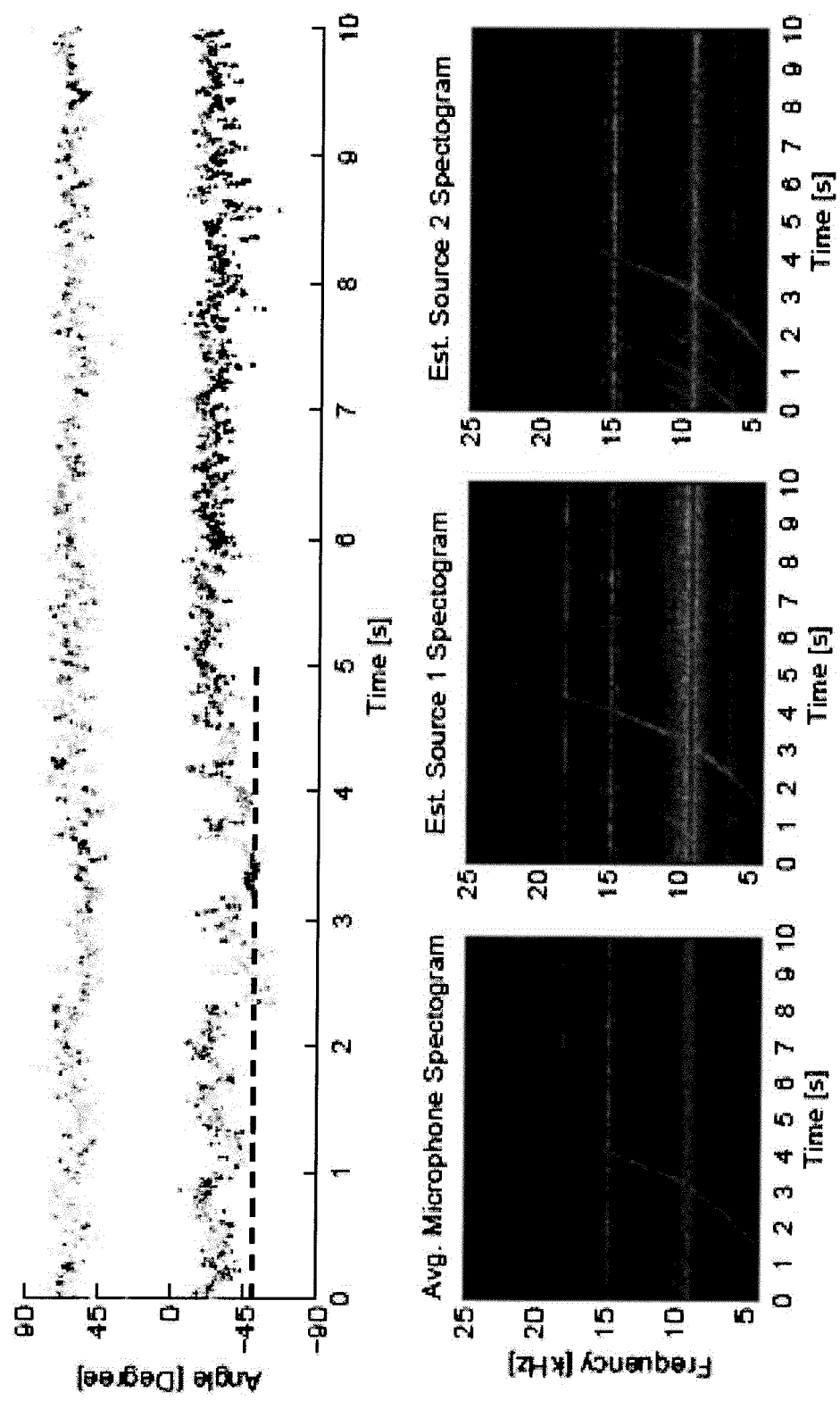

FIG. 16: Test location 2, chirp signal. Particle filter results indicating the true source position (dashed line) and the estimation result (top). Mean spectrogram of measurements (bottom left) and estimated spectrograms of first and second source on linear scale (bottom center and right).

Figure 17:
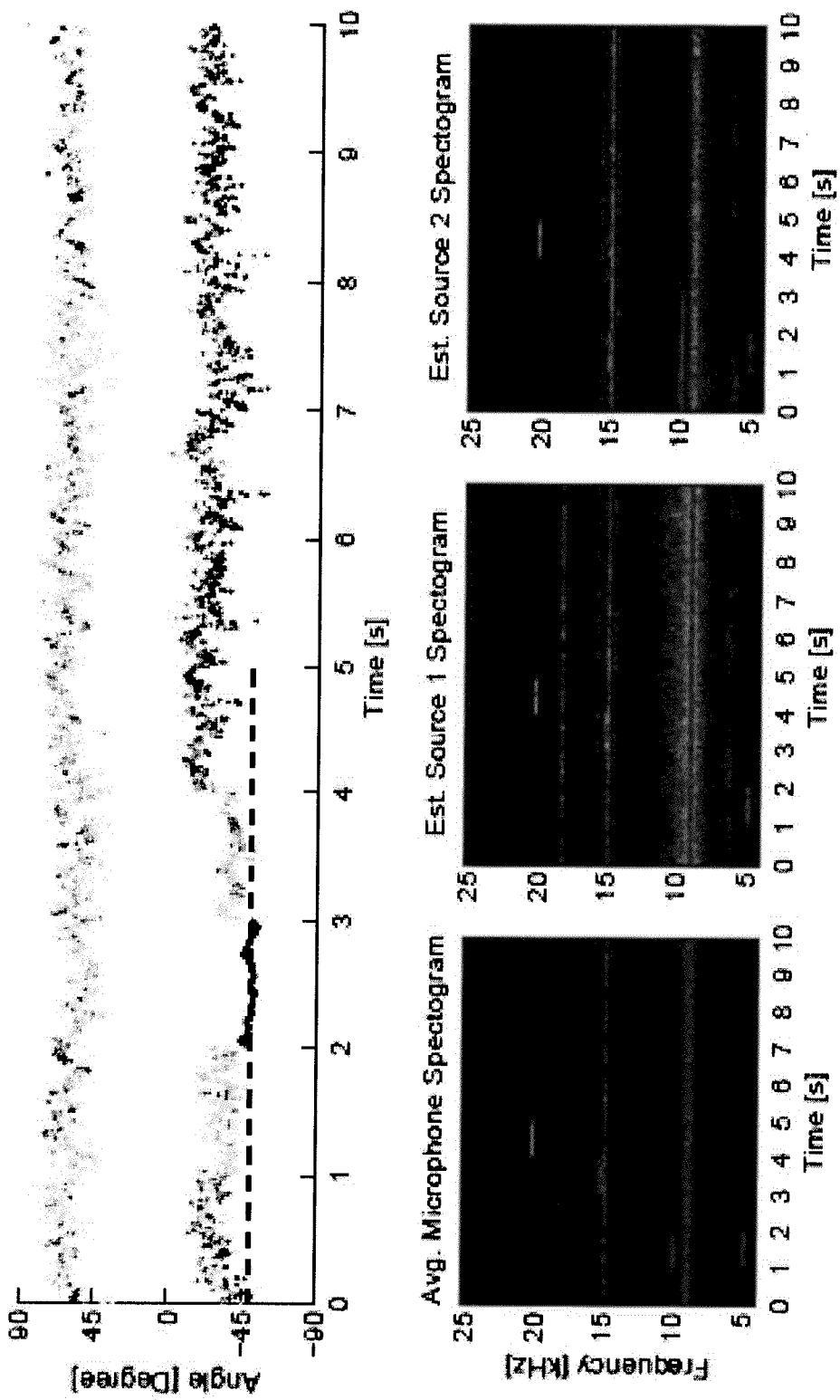

FIG. 17: Test location 2, sine signal. Particle filter results indicating the true source position (dashed line) and the estimation result (top). Mean spectrogram of measurements (bottom left) and estimated spectrograms of first and second source on linear scale (bottom center and right).

Figure 18:
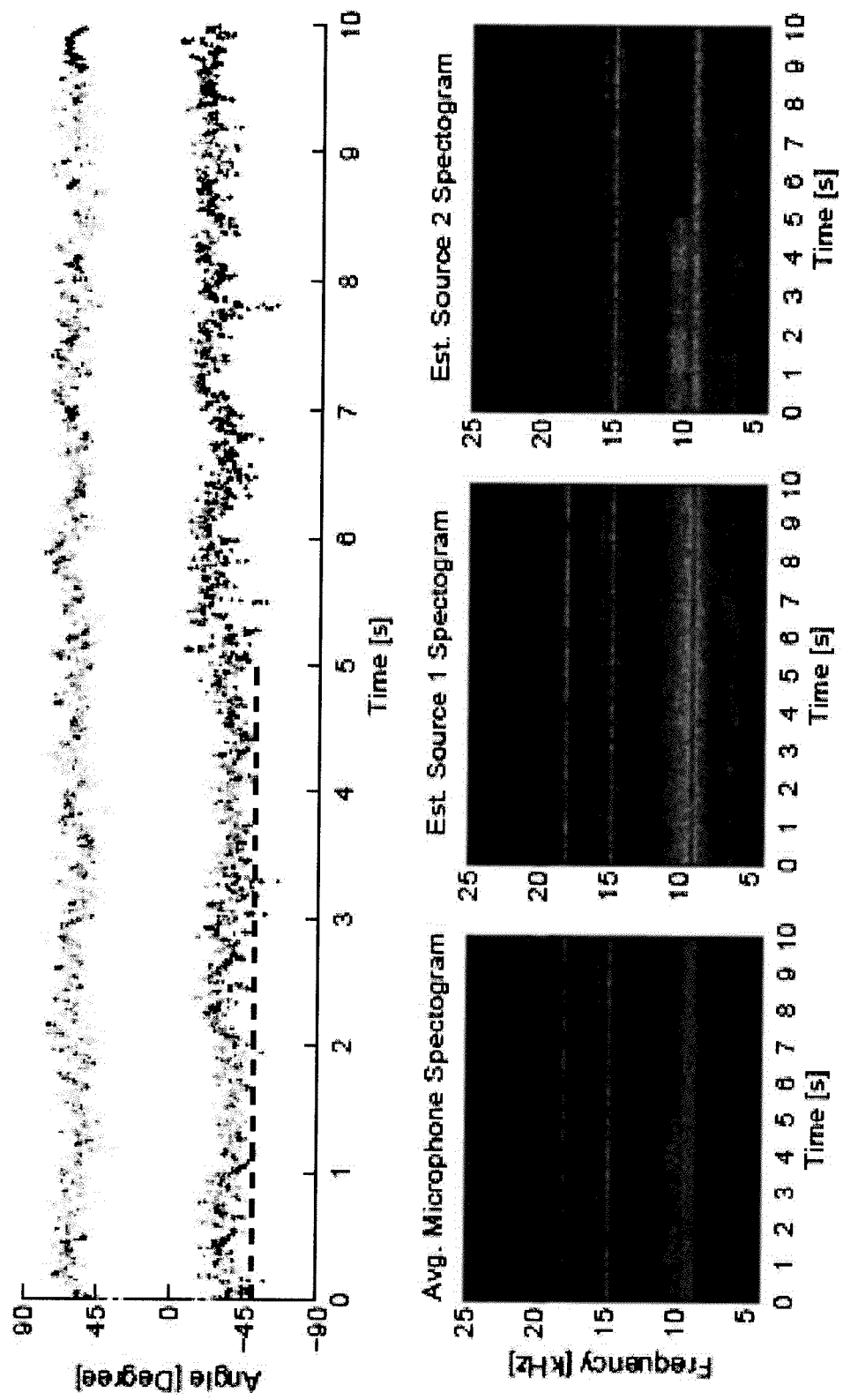

FIG. 18: Test location 2, noise signal. Particle filter results indicating the true source position (dashed line) and the estimation result (top). Mean spectrogram of measurements (bottom left) and estimated spectrograms of first and second source on linear scale (bottom center and right).

Figure 19:
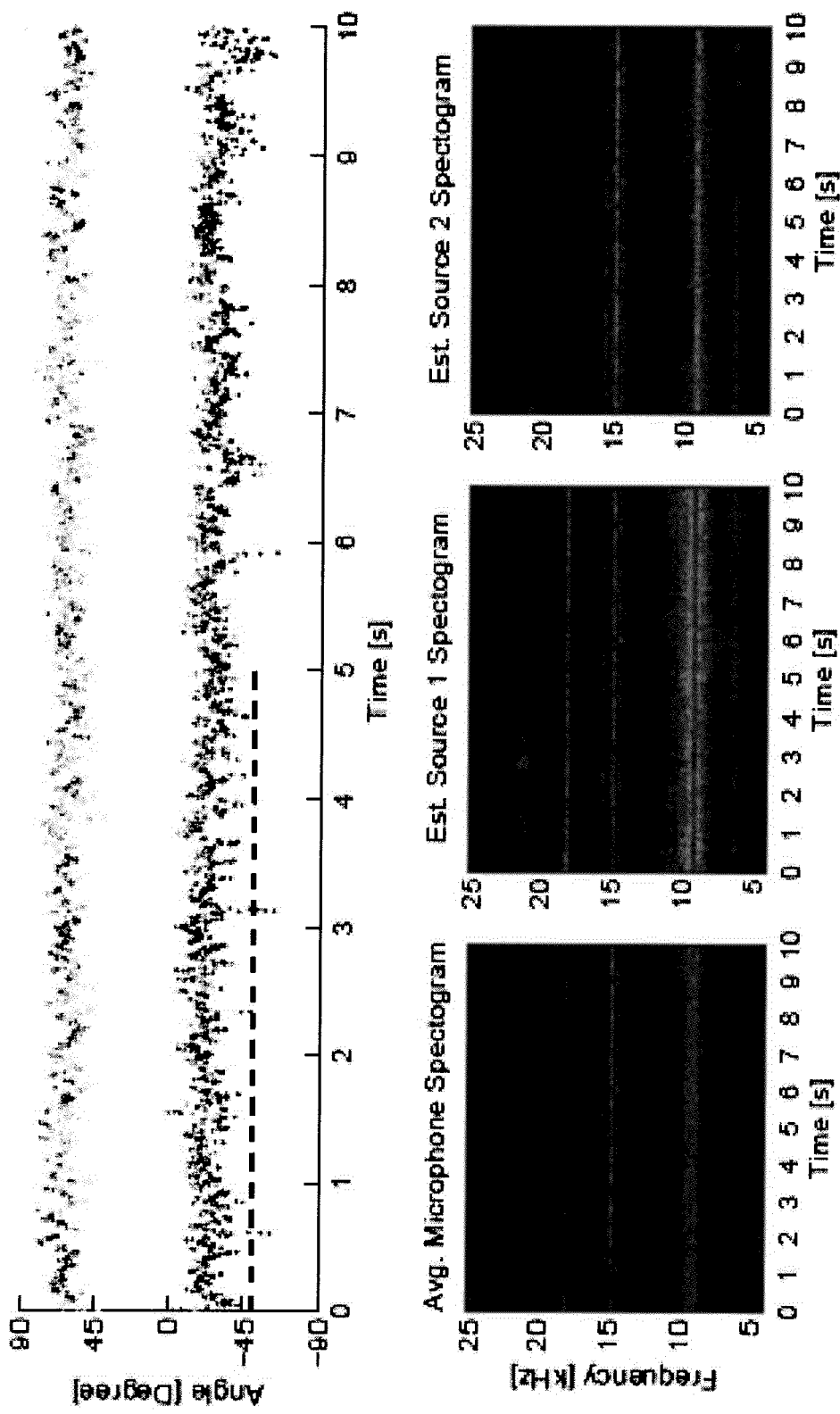

FIG. 19: Test location 2, high-frequency noise signal. Particle filter results indicating the true source position (dashed line) and the estimation result (top). Mean spectrogram of measurements (bottom left) and estimated spectrograms of first and second source on linear scale (bottom center and right).

Figure 20:
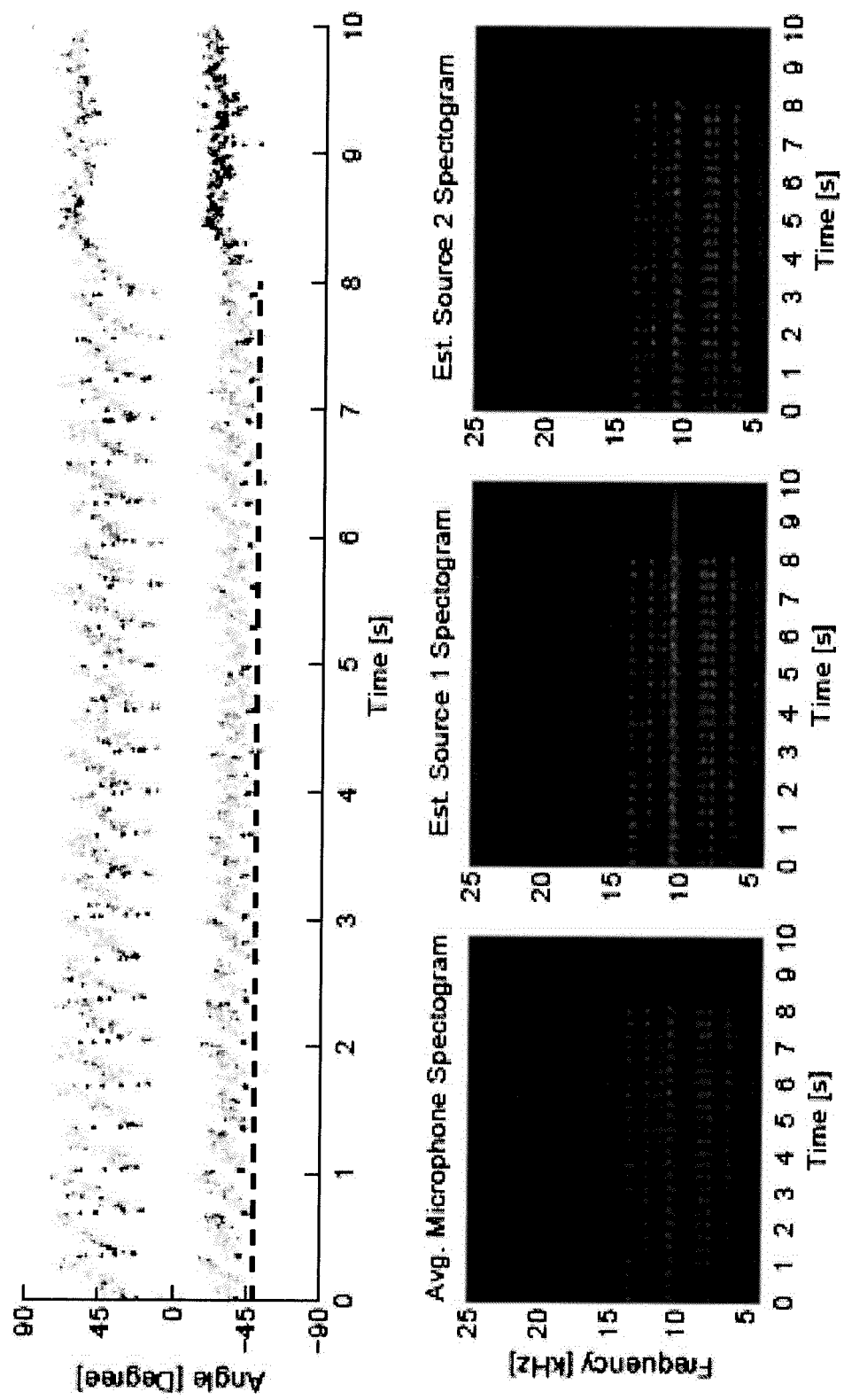

FIG. 20: Test location 2, hammer on metal signal. Particle filter results indicating the true source position (dashed line) and the estimation result (top). Mean spectrogram of measurements (bottom left) and estimated spectrograms of first and second source on linear scale (bottom center and right).

Comparison of Results from Different Test Signals

To better understand and improve a method provided herein in accordance with an aspect of the present invention, a broad range of different source signals was employed. Sines at piecewise constant frequencies were used to examine whether narrowband high SNR signals can be detected. In addition to that, a chirp signal was used, which has the same characteristics as the sine above, but is centered at a slowly time-varying frequency. The case of balanced signal powers and low SNRs is evaluated using a broadband, almost white noise signal with contributions up to 24 kHz and a high-frequency noise signal with contributions between 20 and 25 kHz. The high-frequency noise signal had a low SNR due to limitations of the loudspeakers. Finally, in order to generate high SNR signals, a steel hammer was hit repeatedly on a metal tube.

Discussion of Results

The chirp and sine signals can be correctly detected for most of the signal duration due to their high SNR. The broadband noise signal provokes a visible influence on the location estimates. The signal from the hammer impacts on the metal tube has a high SNR during times when the hammer strokes are audible. The hammer can be correctly located at these time instances.

In summary, a method for blind separation of correlated sources provided herein in accordance with an aspect of the present invention addresses the shortcomings of previous and known methods for blind separation of sources. The provided method can utilize nonlinear and/or non-linearly spaced microphone arrays to cancel disambiguates in the estimated source location. Furthermore, it enables the localization of multiple signals simultaneously and overcomes the assumptions of known methods that signals are disjoint in the time frequency domain or statistically independent. Finally, the implemented method automatically separates the predicted source signals. These and their estimated source locations can be further analyzed e.g., to detect out-of-normal sounds and reason about their origin. The source localization results of the herein provided method show improvements on both synthetic and real world data.

In a further embodiment of the present invention the robustness of source localization and separation is increased by assuming signal coherence over time. In yet a further embodiment of the present invention, the channel estimate for each source-receiver pair is used to address problems in echoic environments.

Figure 21:
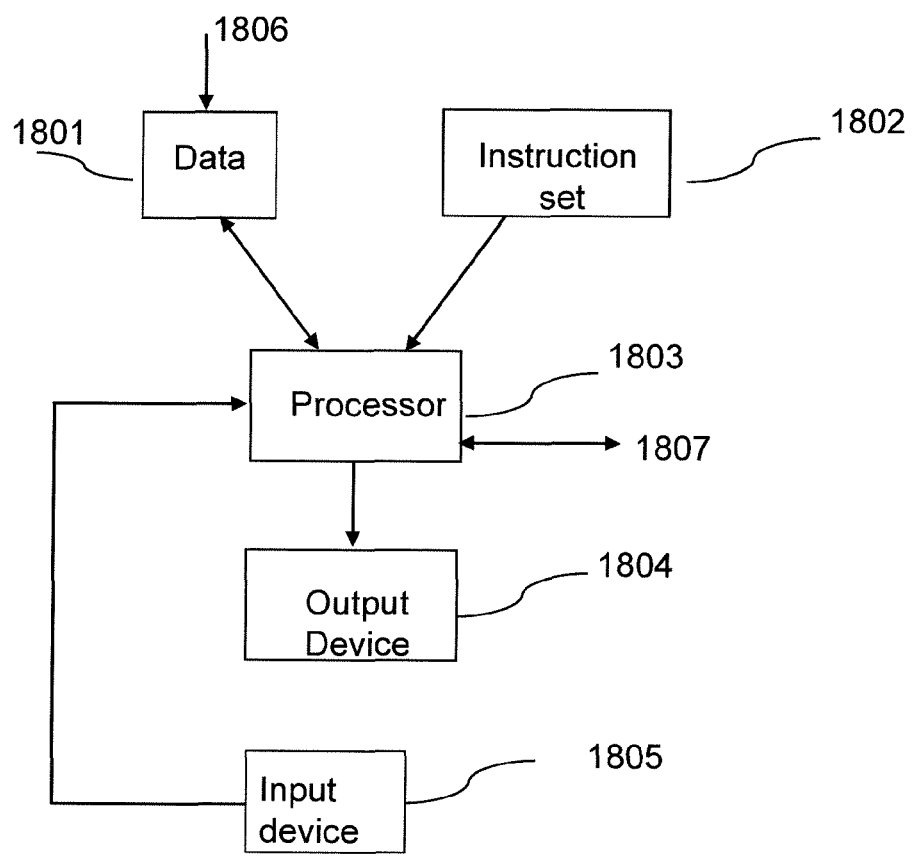
FIG. 21 illustrates a system with a processor in accordance with an aspect of the present invention.

The methods as provided herein are in one embodiment of the present invention implemented on a system or a computer device. A system illustrated in FIG. 21 and as provided herein is enabled for receiving, processing and generating data. The system is provided with data that can be stored on a memory 1801. Data may be obtained from a sensor such as a microphone or a microphone array or may be provided from a data source. Data may be provided on an input 1806. The processor is also provided or programmed with an instruction set or program executing the methods of the present invention is stored on a memory 1802 and is provided to the processor 1803, which executes the instructions of 1802 to process the data from 1801. Data, such as a source localization data or estimated source signals or any other signal resulting from the processor can be outputted on an output device 1804, which may be a display to display data or a loudspeaker to provide an acoustic signal. However, the data generated by the processor may also be used to enable further processing of signals, including to generate a classification of a signal estimated from a source. The processor can also have a communication channel 1807 to receive external data from a communication device and to transmit data to an external device. The system in one embodiment of the present invention has an input device 1805, which may be a sensor, a microphone, a keyboard, a mouse or any other device that can generate data to be provided to processor 1803. The processor can be dedicated hardware. However, the processor can also be a CPU or any other computing device that can execute the instructions of 1802. Accordingly, the system as illustrated in FIG. 21 provides a system for data processing resulting from a sensor or any other data source and is enabled to execute the steps of the methods as provided herein as an aspect of the present invention.

Figure 22:
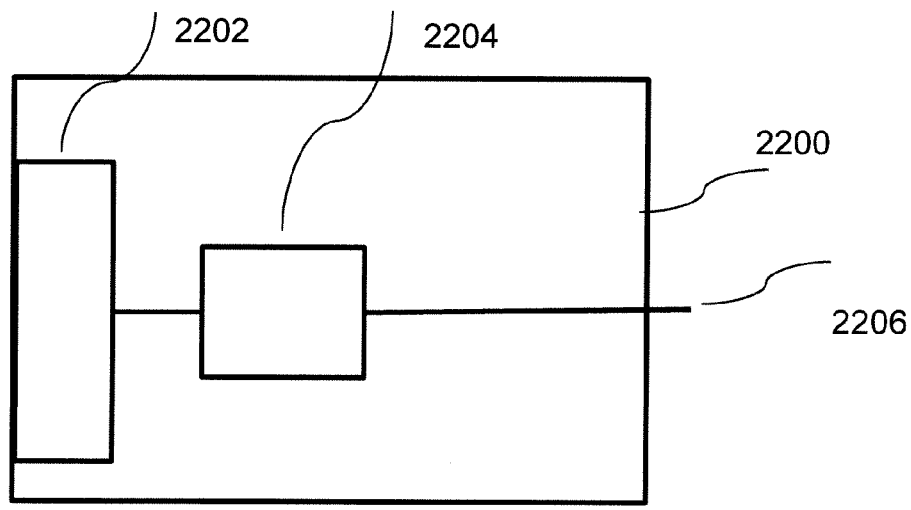
FIG. 22 illustrates an application in accordance with an aspect of the present invention.

Thus, a system and methods have been described herein for blind localization of correlated sources, for instance in a system to detect out-of-normal operations in a machine that generates signals. Such a system is illustrated in FIG. 22. The system 2200 includes a receiver 2202, and a processor 2204. The receiver 2202 has multiple microphones and receives audio signals generated by different audio sources related to a machine. The audio signals are sent to the processor 2204. The processor 2204 can be in the form shown in the preceding figure. The processor 2204 processes the received signals in accordance with the steps described herein. Depending on the results of the processing, the processor 2204 generates a signal on output 2206 that indicates an out-of-normal operating mode.

Formulation in Terms of Direction of Arrival

Previously, aspects of the invention are described with respect to blind localization. Various aspects in the invention can also be expressed in terms of a direction of arrival problem. The rest of the specification does so.

Consider a linear array of M sensors with element spacing $d_m - d_{m-1}$. Impinging on this array are J unknown wavefronts from different directions $\theta_j$. The propagation speed of the wavefronts is c. The number J of sources is assumed to be known and J≤M. The microphones are assumed to be in the far-field of the sources. In DFT domain, the received signal at the $m^{th}$ sensor in the $n^{th}$ subband can be modeled as:

$$X_m(\omega_n) = \sum_{j=0}^{J-1} S_j(\omega_n) e^{-i\omega_n v_m \sin(\theta_j)} + N_m(\omega_n) \quad (28)$$

where $S_j(\omega_n)$ is the jth source signal, $N_m(\omega_n)$ is noise, and $$v_m = \frac{d_m}{c}.$$

The noise is assumed to be circularly symmetric complex Gaussian (CSCG) and iid within each frequency, that is, variances may vary with ω.

The following definitions are used:

$$X_n = [X_0(\omega_n) \ldots X_{M-1}(\omega_n)]^T \quad (29)$$

$$N_n = [N_0(\omega_n) \ldots N_{M-1}(\omega_n)]^T \quad (30)$$

$$S_n = [S_0(\omega_n) \ldots S_{J-1}(\omega_n)]^T \quad (31)$$

Eq. (29) can be rewritten in matrix-vector notation as:

$$X_n = A_n(\theta) S_n + N_n \quad (32)$$

with the M×J steering matrix $A_n(\theta)$:

$$A_n(\theta) = [a(\omega_n, \theta_0), \ldots, a(\omega_n, \theta_{J-1})] \quad (33)$$

whose columns are the M×1 array manifolds:

$$a(\omega_n, \theta_j) = [1 e^{-i\omega_n v_1 \sin(\theta_j)} \ldots e^{-i\omega_n v_{M-1} \sin(\theta_j)}]^T \quad (34)$$

and $$\theta = [\theta_0, \ldots, \theta_{J-1}] \quad (35)$$

Subspace Methods

The most commonly used methods to solve the DOA problem compute signal and noise subspaces from the sample covariance matrix of the received data and choose those $\theta_j$ whose corresponding array manifolds $a(\theta_j)$ are closest to the signal subspace, i.e., $$\hat{\theta} = \underset{\theta}{\mathrm{argmax}} \| P_n(\theta) X_n \| \quad (37)$$

where the columns of $E_N$ form an orthonormal basis of the noise subspace. Reference to $\omega_n$ has been omitted intentionally. Incoherent methods compute signal and noise subspaces $E_N(\omega_n)$ for each subband and the $\theta_j$ are chosen to satisfy (36) on average. Coherent methods, conversely, compute reference signal and noise subspaces by transforming data from all frequencies to a reference frequency. The orthogonality condition (36) is then verified for the reference array manifold only. These methods, of which CSSM and WAVES are two representatives, show significantly better performance than incoherent methods, especially for highly correlated and low SNR signals. But they require good initial DOA estimates for the focusing procedure to be effective and it is not obvious how these can be obtained.

Maximum Likelihood Methods

In contrast to subspace algorithms, ML methods compute the signal subspace from the A matrix and choose $\theta_0, \ldots, \theta_{J-1}$ that best fit the observed data in terms of maximizing its projection on that subspace:

$$\hat{\theta}_j = \underset{\theta}{\mathrm{argmin}} a(\theta)^H E_N E_N^H a(\theta) \quad (36)$$

where $P_n = A(A^H A)^{-1} A^H$ is a projection matrix on the signal subspace spanned by the columns of $A_n(\theta)$.

If noise variances are equal across frequencies, an overall log-likelihood function for the wideband problem can be obtained by summing (37) across frequencies. The problem of varying noise variances across frequencies has not been addressed to date.

In "C. E. Chen. F. Lorenzelli, R. E. Hudson, and K. Yao. Maximum likelihood doa estimation of multiple wideband sources in the presence of nonuniform sensor noise. EURASIP Journal on Advances in Signal Processing, 2008: Article ID 835079, 12 pages, 2008. doi:10.1155/2008/835079, 2008" the case of non-uniform noise across sensors, but constant across frequencies, has been investigated in great detail. ML methods offer higher flexibility regarding array layouts and signal correlations than subspace methods and generally show better performance for small sample sizes, but the nonlinear multidimensional optimization in (37) is computationally complex. Recently, importance sampling methods have been proposed for the narrowband case to solve the optimization problem efficiently as described in "Huigang Wang, S. Kay, and S. Saha. An importance sampling maximum likelihood direction of arrival estimator. Signal Processing, IEEE Transactions on, 56(10): 5082-5092, 2008." The particle filter employed in a method provided herein in accordance with an aspect of the present invention approaches the nonlinear optimization in a similar way.

DOA Estimation

Under the model (28), the observations $X_0, \ldots, X_{M-1}$ are iid CSCG random variables, if conditioned on $S_n$ and θ the joint pdf, factorize into the marginal ones. For the negative log-likelihood one has:

$$-\log p(X_n \mid S_n, \theta) \propto \propto \sum_{m=0}^{M-1} \left| X_m - \sum_{j=0}^{J-1} S_j e^{-i\omega_n v_m \sin(\theta_j)} \right|^2 \triangleq \operatorname{Ln}(\theta, S_N) \quad (38)$$

It is common to compute the solution for $S_n$:

$$\hat{S}_n(\theta) = A_n(\theta)^\dagger X_n \quad (39)$$

given fixed $\theta$ and solve for $\theta$ by maximizing the remaining concentrated log-likelihood ($A^\dagger$ denotes the Moore-Penrose inverse of A). Eq. (39) is a simple least squares regression and great care must be taken with the problem of overfitting the data, especially if at some frequency there are signals with significantly more power than other signals.

If the noise variances $\sigma_n^2$ were known, a global (negative) log-likelihood could be computed by summing the frequency likelihoods:

$$L(\theta, S_{0:N-1}) = \sum_{n=0}^{N-1} \frac{L_n(\theta, S_n)}{\sigma_n^2} \quad (40)$$

This criterion function has been stated previously and was considered intractable (in 1990) as described in "James A. Cadzow. Multiple source localization—the signal subspace approach. IEEE Transactions on Acoustics, Speech, and Signal Processing, 38(7):1110-1125, July 1990." Below a particle filter method is provided as an aspect of the present invention to solve the filtering problem for multiple snapshots that naturally solves the optimization problem as a byproduct. In practical applications, a good weighting scheme is necessary, as will be provided below as an aspect of the present invention, as well as a regularization scheme that improves performance.

Weighting

The noise variance $\sigma^2$ in equation (40) cannot be estimated from a single snapshot. Instead, the noise variances are re-interpreted as weighting factors $\tau_n$, a viewpoint that is taken by BSS algorithms like DUET. In practice, the signal bandwidths may not be known exactly and in some frequency bins the assumption of J signals breaks down. The problem of overfitting becomes severe in these bins and including them in the estimation procedure can distort results. The following weights are provided to account for inaccurate modeling, high-noise bins, and outlier bins:

$$\hat{\tau}_n = \varphi\left(\frac{\|P_n(\theta) X_n\|}{\|X_n\|}\right) \quad (41)$$

$$\tau_n = \frac{\hat{\tau}_n}{\sum_{n=0}^{N-1} \hat{\tau}_n} \quad (42)$$

where $\varphi$ is a non-negative non-decreasing weighting function. Its argument measures the portion of the received signal that can be explained given the DOA vector $\theta$. $\tau_n$ are the normalized weights.

Overfitting

As indicated above, computing the ML estimate for $S_n$ in (37) can be subject to overfitting, especially if the number of sensors is small or the J signal assumption breaks down. In ridge-regression, penalty terms are introduced for the estimation variables and in Bayesian analysis these translate to prior distribution for the $S_n$. Accordingly, the ML estimates of $S_n$ as an aspect of the present invention are substituted with MAP approximates under exponential priors for the signal powers. If one chooses:

$$p(|S_j(\omega_n)|^2) = \lambda e^{-\lambda |S_j(\omega_n)|^2} \Pi_{[0,\infty)}(|S_j(\omega_n)|^2) \quad (43)$$

with $\lambda > 0$ and $\Pi$ being the indicator function, the negative log-posterior for $S_n$ given $\theta$ can be written:

$$L_n^{reg}(\theta, S_n) = L_n(\theta, S_n) + \sum_{j=0}^{J-1} \lambda |S_j(\omega_n)|^2. \quad (44)$$

Particle Filter

The likelihood function for $S_n$ and $\theta$ can be computed from equation (40):

$$p(X_{0:N-1} \mid \theta, S_{0:N-1}) \propto e^{-\gamma L(\theta, S_{0:N-1})} \quad (45)$$

This is the true likelihood function only if the true noise variance at frequency n is $\sigma_n^2 = (\gamma \tau_n)^{-1}$. For what follows this is assumed to be the case.

The time dimension is included into the estimation procedure by means of a particle filter. Starting with the old posterior pdf:

$$p^{k-1} = p(\theta^{k-1}, S_{0:N-1}^{k-1} \mid I^{k-1}) \quad (46)$$

where $I^{k-1}$ denotes all information (measurements) up to time instant $k-1$, Bayes' rule and elementary calculations are used to update the posterior as new measurements become available:

$$p^k \propto l^k z^{k,k-1} p^{k-1} \quad (47)$$

with the likelihood:

$$l^k = p(X_{0:N-1}^k \mid \theta^k, S_{0:N-1}^k) \quad (48)$$

and a first order Markov transition kernel for the estimation variables $\theta$ and $S_n$:

$$z^{k,k-1} = p(\theta^k, S_{0:N-1}^k \mid \theta^{k-1}, S_{0:N-1}^{k-1}) \quad (49)$$

It is assumed that source movements and signals are independent and that signals are independent between time steps. It is furthermore assumed that sources move independently. Hence, the transition kernel can be separated:

$$z^{k,k-1} = p(S_{0:N-1}^k) \cdot \Pi_{j=0}^{J-1} p(\theta_j^k \mid \theta_j^{k-1}) \quad (50)$$

The problem of particle depletion is addressed through resampling if the effective number of particles $N_{eff} = (\Sigma_{i=0}^{P-1} (w_{(i)}^k)^2)^{-1}$ falls below a predetermined threshold, as is for instance described in "Sanjeev Arulampalam, Simon Maskell, Neil Gordon, and Tim Clapp. A tutorial on particle filters for on-line non-linear/non-gaussian Bayesian tracking. IEEE Transactions on Signal Processing, 50:174-188, 2001."

For $\theta_j$ the following modification of a random walk is used as transition density:

$$p(\theta_j^k \mid \theta_j^{k-1}) = \alpha U_{[-\frac{\pi}{2}, \frac{\pi}{2}]} + (1-\alpha) P_{[-\frac{\pi}{2}, \frac{\pi}{2}]} N(\theta_j^{k-1}, \sigma_\theta^2) \quad (51)$$

where $0 \leq \alpha \ll 1$, $$U_{[-\frac{\pi}{2}, \frac{\pi}{2}]}$$

denotes the pdf of a uniform distribution on $$[-\frac{\pi}{2}, \frac{\pi}{2}],$$

and $$P_{[-\frac{\pi}{2},\frac{\pi}{2}]}N(\theta_j^{k-1}, \sigma_\theta^2)$$

denotes the pdf of a normal distribution with mean $\theta_j^{k-1}$ and variance $\sigma_\theta^2$ projected on $$[-\frac{\pi}{2}, \frac{\pi}{2}]\theta' = a\sin(\sin(\theta)).$$

A small world proposal density according to "Yongtao Guan, Roland Fleissner, Paul Joyce, and Stephen M. Krone. Markov chain monte carlo in small worlds. Statistics and Computing, 16:193-202, June 2006" is used, because this is likely to speed up convergence, especially in the present case with multimodal likelihood functions.

Computer Simulations

The method herein provided in accordance with an aspect of the present invention was tested with three different computer simulated scenarios. In all scenarios, equipowered sources that emit temporally white Gaussian noise signals are in the far-field of a linear array of M sensors. Any two different source signals are correlated with $\rho \in [-1,1]$; sensors are subject to iid white Gaussian noise. An L-point FFT with rectangular window was performed on the sensor output and further processing was done on N frequency bins within the sensor passband $f_0 \pm \Delta f$. SNR values are per sensor and for the passband. In the first two scenarios, intersensor spacing is $$d = \frac{\lambda_0}{2}$$

between all elements (ULA) where $$\lambda_0 = \frac{c}{f_0}.$$

For the particle filter, a uniform initial distribution was used for the $\theta_{(i),j}$ of all P particles and $\phi(x)=x^4$ as weighting function. The bin size of the histogram used for extraction of the MAP estimate is $\Delta_h$. For $\gamma$ the following heuristic was used:

$$\gamma^k = \frac{10}{\sum_{i=0}^{P-1} L(\theta_{(i)}^k, S_{(i),0:N-1}^k)} \quad (52)$$

WAVES, CSSM, IMUSIC, and TOPS compute DOA estimates based on the current and the Q preceding blocks. This allows for on-line dynamic computations and is substantially different from processing a complete time series offline. WAVES and CSSM use RSS focusing matrices as described in "H. Hung and M. Kaveh. Focusing matrices for coherent signal-subspace processing. Acoustics, Speech and Signal Processing, IEEE Transactions on, 36(8):1272-1281, August 1988" to cohere the sample SCMs with the true angles as focusing angles. This is an unrealistic assumption but provides an upper bound on performance for coherent methods. The WAVES algorithm is implemented as described in "E. D. di Claudio and R. Parisi. Waves: weighted average of signal subspaces for robust wideband direction finding. Signal Processing, IEEE Transactions on, 49(10):2179, October 2001" and Root-MUSIC was used herein as narrowband technique for both CSSM and WAVES.

The parameter values of the three scenarios are listed in the following Table 2.

TABLE 2

| | M | Source Positions | $f_x$ | $f_0$ | $\Delta f$ | B | L | N | Q | P | $\sigma_0^2$ | $\alpha$ | $\Delta_h$ |
|---|---|---|---|---|---|---|---|---|---|---|---|---|---|
| Scenario 1 | 10 | 8°, 13°, 33°, 37° | 400 Hz | 100 Hz | 40 Hz | 200 | 256 | 52 | 25 | 2000 | $(0.5°)^2$ | 0.03 | 0.5° |
| Scenario 2 | 7 | 8°, 13°, 33° | 44 kHz | 10 kHz | 9.9 kHz | 220 | 1024 | 462 | 88 | 200 | $(1°)^2$ | 0.03 | 3° |
| Scenario 3 | 4 | moving | 400 Hz | 100 Hz | 100 Hz | 400 | 256 | 52 | — | 1000 | $(3°)^2$ | 0.05 | 0.5° |

As an evaluation measure $p_{all}(\Delta\theta)$ was used, which reflects the percentage of blocks where all sources are detected within $\pm\Delta\theta$ of the true DOA. Each simulation consists of (B+Q)L samples and evaluation $p_{all}(\Delta\theta)$ is averaged over the last B blocks. All results are based on 200 Monte Carlo runs for each combination of parameters.

The first scenario was used in "H. Wang and M. Kaveh. Coherent signal-subspace processing for the detection and estimation of angles of arrival of multiple wide-band sources. Acoustics, Speech and Signal Processing, IEEE Transactions on, 33(4):823, August 1985" and "E. D. di Claudio and R. Parisi. Waves: weighted average of signal subspaces for robust wideband direction finding. Signal Processing, IEEE Transactions on, 49(10):2179, October 2001."

Figure 23:
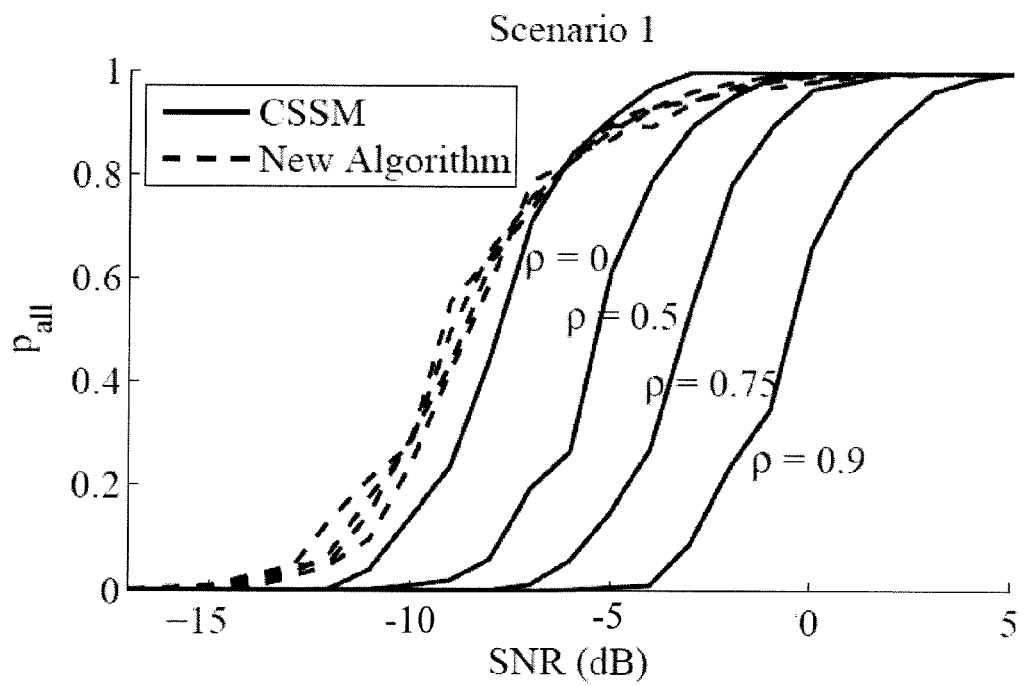
FIGS. 23-25 illustrate a performance of methods and systems provided in accordance with one or more aspects of the present invention.

FIG. 23 illustrates a scenario 1: Percentage of blocks where all sources are detected within 2° versus SNR for different values of the source correlation factor $\rho$. The particle filter can discriminate correlated signals at various SNRs in contrast to CSSM. The results in FIG. 23 show that the particle filter based method can resolve closely spaced signals at low SNR values and for arbitrary correlations. In contrast, the resolution threshold for CSSM increases with correlation (no spatial averaging was applied as this restricts the possible array geometries). The WAVES results were nearly identical with the CSSM results and are not shown for clarity. None of the incoherent methods succeeded in resolving all four sources in this low SNR scenario. The graphs show that the proposed algorithm outperforms CSSM in dynamic scenarios averaging length Q corresponds to approximately 4 seconds—even when perfect focusing is used.

Figure 24:
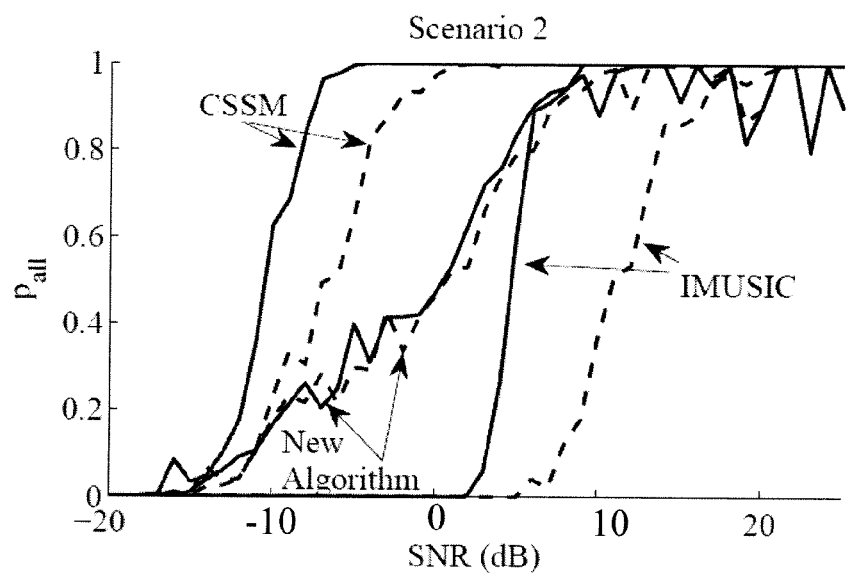

Scenario 2 is illustrated in FIG. 24. $p_{all}(2.5°)$ versus SNR for $\rho=0$ (straight lines) and $\rho=0.1$ (dashed lines). For the second scenario (see FIG. 24), parameters were used relevant for audio signals. To achieve realtime computations on a dual-core laptop, the particle filter method uses only the top 10% high energy frequency bins (N=47). The bin size of the histogram used for MAP extraction was 3°. The results show that a suboptimal particle filter with few particles using only 10% of the available information is a valid alternative to CSSM (again, the WAVES results were nearly identical and are not shown) and outperforms (MUSIC.

Figure 25:
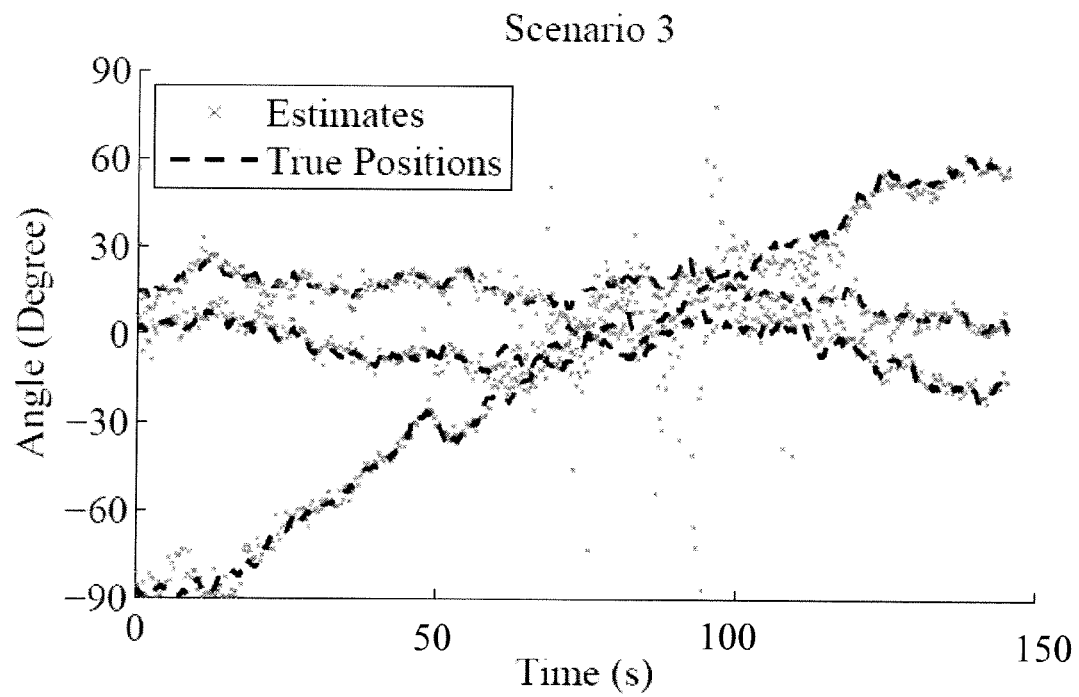

A Scenario 3 is illustrated in FIG. 25, showing in a graph source positions against time. In this third scenario, as illustrated in FIG. 25, the potential of the herein provided method to track moving sources is shown. A non-uniform, linear array of M=4 sensors with coordinates $d_0, \ldots, d_{M-1}$ and distances $d_m - d_{m-1} = d + \Delta d$ where $$d = \frac{\lambda_0}{c}$$

and $\Delta d \sim U_{[-0.2d, 0.2d]}$. The signals are concentrated in the signal passband $[f_0 - \Delta f_{SRC}, f_0 + \Delta f_{SRC}] \subset [f_0 - \Delta f, f_0 + \Delta f]$ with $\Delta f_{SRC} = 20$ Hz and an SNR of 0 dB total signal power to total noise power was used. The current method succeeds in estimating the correct source locations of moving sources before they cross and after they cross.

In one embodiment of the present invention the method as provided herein includes an estimation of the number of sources in the wake of "C. Andrieu and A. Doucet. Joint Bayesian model selection and estimation of noisy sinusoids via reversible jump mcmc. Signal Processing, IEEE Transactions on, 47(10):2667-2676, October 1999" using reversible jump Markov Models. This will prevent the "ghost" estimates when sources cross.

Aspects of the present invention are also explained in yet the following description.

The following provides a further description of a direction of arrival estimation scheme for wideband sources that is based on the Bayesian paradigm in accordance with a aspect of the present invention. The provided method of which an implementation is identified under the acronym "MUST" approximates the posterior probability density function of the DOAs in timefrequency domain with a particle filter. In contrast to other prior methods, no time-averaging is necessary, therefore moving sources can be tracked. The herein provided method uses a new low complexity weighting and regularization scheme to fuse information from different frequencies and to overcome the problem of overfitting when few sensors are available. Decades of research have given rise to many methods that solve the direction of arrival (DOA) estimation problem and these methods find application in fields like radar, wireless communications or speech recognition as described in "H. Krim and M. Viberg. Two decades of array signal processing research: the parametric approach. Signal Processing Magazine, IEEE, 13(4): 67-94, July 1996." DOA estimation requires a sensor array and exploits time differences of arrival between sensors. Narrowband methods approximate these differences with phase shifts. Most of the existing methods for this problem are variants of ESPRIT as described in "R. Roy and T. Kailath. Esprit-estimation of signal parameters via rotational invariance techniques. Acoustics, Speech and Signal Processing, IEEE Transactions on, 37(7):984, July 1989" or MUSIC as described in "R. Schmidt. Multiple emitter location and signal parameter estimation. Antennas and Propagation, IEEE Transactions on, 34(3):276, March 1986" that use subspace fitting techniques as described in "M. Viberg and B. Ottersten. Sensor array processing based on subspace fitting. Signal Processing, IEEE Transactions on, 39(5):1110-1121, May 1991" and are fast to compute a solution. In general, the performance of subspace based methods degrades with signal correlation. Statistically optimal methods such as Maximum Likelihood (ML) as described in "P. Stoica and K. C. Sharman. Acoustics, speech and signal processing, Acoustics, Speech and Signal Processing, IEEE Transactions on, 38(7):1132. July 1990" or Bayesian methods as described in "J. Lasenby and W. J. Fitzgerald. A bayesian approach to high-resolution beamforming. Radar and Signal Processing, IEE Proceedings F, 138(6):539-544, December 1991" were long considered intractable as described in "James A. Cadzow. Multiple source localization—the signal subspace approach. IEEE Transactions on Acoustics, Speech, and Signal Processing, 38(7):1110-1125, July 1990", but have been receiving more attention recently such as in "C. Andrieu and A. Doucet. Joint Bayesian model selection and estimation of noisy sinusoids via reversible jump mcmc. Signal Processing, IEEE Transactions on, 47(10):2667-2676, October 1999" and "J. Huang. P. Xu, Y. Lu, and Y. Sun. A novel bayesian high-resolution direction-of-arrival estimator. OCEANS, 2001. MTS/IEEE Conference and Exhibition, 3:1697-1702, 2001."

Methods for wideband DOA are mostly formulated in the time-frequency (t-f) domain. The narrowband assumption is then valid for each subband or frequency bin. Incoherent signal subspace methods (ISSM) compute DOA estimates that fulfill the signal and noise subspace orthogonality condition in all subbands simultaneously. On the other hand, coherent signal subspace methods (CSSM) such as described in "H. Wang and M. Kaveh. Coherent signal-subspace processing for the detection and estimation of angles of arrival of multiple wide-band sources. Acoustics. Speech and Signal Processing, IEEE Transactions on, 33(4):823, August 1985" compute a universal spatial covariance matrix (SCM) from all data. Any narrowband signal subspace method can then be used to analyze the universal SCM. However, good initial estimates are necessary to correctly cohere the subband SCMs into the universal SCM such as described in "D. N. Swingler and J. Krolik. Source location bias in the coherently focused high-resolution broad-band beamformer. Acoustics. Speech and Signal Processing, IEEE Transactions on, 37(1): 143-145, January 1989." Methods like BI-CSSM as described in "Ta-Sung Lee. Efficient wideband source localization using beamforming invariance technique. Signal Processing, IEEE Transactions on, 42(6):1376-1387, June 1994" or TOPS as described in "Yeo-Sun Yoon, L. M. Kaplan, and J. H. McClellan. Tops: new doa estimator for wideband signals. Signal Processing, IEEE Transactions on, 54(6):1977, June 2006" were developed to alleviate this problem.

Subspace methods use orthogonality of signal and noise subspaces as the criterion of optimality. Yet, a mathematically more appealing approach is to ground the estimation on a decision theoretic framework. A prerequisite is the computation of the posterior probability density function (pdf) of the DOAs, which can be achieved with particle filters. Such an approach is taken in "W. Ng, J. P. Reilly, and T. Kirubarajan. A bayesian approach to tracking wideband targets using sensor arrays and particle filters. Statistical Signal Processing, 2003 IEEE Workshop on, pages 510-513, 2003", where a Bayesian maximum a posteriori (MAP) estimator is formulated in the time domain.

Herein, a Bayesian MAP estimator is presented using the time-frequency representation of the signals. The advantage of time-frequency analysis is shown by techniques used in BSS such as DUET as described in "Scott Rickard, Radu Balan, and Justinian Rosca. Real-time time-frequency based blind source separation. In Proc. of International Conference on Independent Component Analysis and Signal Separation (ICA2001), pages 651-656, 2001" and DESPRIT as described in "Thomas Melia and Scott Rickard. Underdetermined blind source separation in echoic environments using desprit, 2007." These methods exploit dissimilar signal fingerprints to separate signals and work well for speech signals.

The presented multiple source tracking of which an implementation or embodiment is called MUST method uses a novel, heuristic weighting scheme to combine information across frequencies. A particle filter approximates the posterior density of the DOAs and a MAP estimate is extracted. Some widely used other methods will be discussed and a detailed description of MUST will be provided. Simulation results of using the herein provided MAP estimator in accordance with an aspect of the present invention and in comparison with WAVES as described in "E. D. di Claudio and R. Parisi. Waves: weighted average of signal subspaces for robust wideband direction finding. Signal Processing, IEEE Transactions on, 49(10):2179, October 2001", CSSM, and IMUSIC will be provided.

A Further Problem Formulation and Related Work

Consider a linear array of M sensors with distances between sensor 1 and m denoted as $d_m$. Impinging on this array are J unknown wavefronts from different directions $\theta_j$. The propagation speed of the wavefronts is c. The number J of sources is assumed to be known and $J \leq M$. The microphones are assumed to be in the far-field of the sources. In DFT domain, the received signal at the $m^{th}$ sensor in the $n^{th}$ subband can be modeled as:

$$X_m(\omega_n) = \sum_{j=0}^{J-1} S_j(\omega_n) e^{-i\omega_n v_m \sin(\theta_j)} + N_m(\omega_n) \quad (53)$$

where $S_j(\omega_n)$ is the jth source signal, $N_m(\omega_n)$ is noise and $$v_m = \frac{d_m}{c}.$$

The noise is assumed to be circularly symmetric complex Gaussian (CSCG) and iid within each frequency, that is, variances may vary with $\omega$. If one defines $X_n = [X_0(\omega_n) \ldots X_{M-1}(\omega_n)]^T$ and $N_n$ and $S_n$ similarly, eq. (53) can be rewritten in matrix-vector notation as:

$$X = A_n(\theta)S_n + N_n \quad (54)$$

with the M×J steering matrix:

$$A_n(\theta) = [a(\omega_n, \theta_1), \ldots, a(\omega_n, \theta_j)] \quad (55)$$

whose columns are the M×1 array manifolds $$a(\omega_n, \theta_j) = [1 e^{-i\omega_n v_1 \sin(\theta_j)} \ldots e^{-i\omega_n v_{M-1} \sin(\theta_j)}]^T \quad (56)$$

Subspace Methods

The most commonly used methods to solve the DOA problem compute signal and noise subspaces from the sample covariance matrix of the received data and choose those $\theta_j$ whose corresponding array manifolds $a(\theta_j)$ are closest to the signal subspace, i.e., $$\hat{\theta}_j = \arg\min_{\theta} a(\theta)^H E_N E_N^H a(\theta) \quad (57)$$

where the columns of $E_N$ form an orthonormal basis of the noise subspace. Reference to $\omega_n$ has been omitted intentionally. Incoherent methods compute signal and noise subspaces $E_N(\omega_n)$ for each subband and the $\theta_j$ are chosen to satisfy (57) on average. Coherent methods, conversely, compute reference signal and noise subspaces by transforming data from all frequencies to a reference frequency. The orthogonality condition (57) is then verified for the reference array manifold only. These methods, of which CSSM and WAVES are two representatives, show significantly better performance than incoherent methods, especially for highly correlated and low SNR signals. But they require good initial DOA estimates for the focusing procedure to be effective and it is not obvious how these can be obtained.

Maximum Likelihood Methods

In contrast to subspace methods, ML methods compute the signal subspace from the $A_n$ matrix and choose $\hat{\theta}$ that best fits the observed data in terms of maximizing its projection on that subspace:

$$\hat{\theta} = \arg\max_{\theta} \|P_n(\theta) X_n\| \quad (58)$$

where $P = A(A^H A)^{-1} A^H$ is a projector on the signal subspace spanned by the columns of $A_n(\theta)$. This deterministic ML estimates presumes no knowledge of the signals. If signals statistics were known, a stochastic ML estimates could be computed.

If noise variances are equal for all frequencies, an overall log-likelihood function for the wideband problem can be obtained by summing (58) across frequencies. The problem of varying noise variances has not been addressed to date. In "C. E. Chen, F. Lorenzelli, R. E. Hudson, and K. Yao. Maximum likelihood doa estimation of multiple wideband sources in the presence of nonuniform sensor noise. EURASIP Journal on Advances in Signal Processing, 2008: Article ID 835079, 12 pages, 2008. doi:10.1155/2008/835079, 2008" the case of non-uniform noise w.r.t. sensors, but constant across frequencies, has been investigated. ML methods offer higher flexibility regarding array layouts and signal correlations than subspace methods and generally show better performance for small sample sizes, but the nonlinear multidimensional optimization in (58) is computationally complex. Recently, importance sampling methods have been proposed for the narrowband case to solve the optimization problem efficiently as described in "Huigang Wang, S. Kay, and S. Saha. An importance sampling maximum likelihood direction of arrival estimator. Signal Processing, IEEE Transactions on, 56(10):5082-5092, 2008." The particle filter employed as an aspect of the present invention and in the method provided as an aspect of the present invention, for instance in the MUST implementation, tackles the optimization along these lines.

Multiple Source Tracking (MUST)

Under the model (53), the observations $X_0, \ldots, X_{M-1}$ are iid CSCG random variables if conditioned on $S_n$ and $\theta$. Therefore, the joint pdf factorizes into the marginals. For $\omega_n$, the negative log-likelihood is given by $$-\log p(X_n | S_n, \theta) \propto \|X_n - A_n(\theta) S_2\|^2 \quad (59)$$

It is common to compute the ML solution for $S_n$ as $$\hat{S}_n(\theta) = A_n(\theta)^\dagger X_n \quad (60)$$

with $A^\dagger$ denoting the Moore-Penrose inverse of $A_n$. A solution to $\theta$ is found by solving (60) for a fixed $\theta$ and iteratively improving on this estimate by minimizing the remaining concentrated negative log-likelihood $$L_n(\theta) \triangleq \|X_n - A_n(\theta)\hat{S}_n\|^2 \quad (61)$$

If the noise variances $\sigma_n^2$ were known, a global (negative) log-likelihood could be computed by summing the frequency likelihoods:

$$L(\theta) = \sum_{n=1}^{N} \frac{L_n(\theta)}{\sigma_n^2} \quad (62)$$

This criterion function has been stated previously and was considered intractable (in 1990) as described in "James A. Cadzow. Multiple source localization—the signal subspace approach. IEEE Transactions on Acoustics, Speech, and Signal Processing, 38(7):1110-1125, July 1990." Below a particle filter method is provided as an aspect of the present invention to solve the filtering problem for multiple snapshots that naturally solves the optimization problem as a byproduct. In practical applications, a regularization scheme as provided in accordance with an aspect of the present invention will improve performance. Furthermore, weighting of the frequency bins is necessary. The low-complexity approach provided in accordance with an aspect of the present invention is provided below.

Regularization

Eq. (60) is a simple least squares regression and great care must be taken with the problem of overfitting the data. This problem is accentuated if the number of microphones is small or if the assumption of J signals breaks down in some frequency bins.

In ridge-regression, penalty terms are introduced for the estimation variables and in Bayesian analysis these translate to prior distributions for the $S_n$.

Similarly to Eq. (60), a MAP estimate of $S_n$ is $$\hat{S}_n(\theta) = (A_n^H A + \lambda_n I)^{-1} A_n^H X_n \quad (63)$$

where $\lambda_n$ is a regularization parameter for frequency component $\omega_n$. We can now eliminate $S_n$ and work exclusively with the concentrated log-likelihoods that can be written $$L_n^{reg}(\theta) = \|(I - P_n(\theta))X_n\|^2 \quad (64)$$

with $$\hat{P}_n(\theta) = A_n(A_n^H A_n + \lambda_n I)^{-1} A_n^H \quad (65)$$

Weighting

The noise variance $\sigma^2$ in equation (62) cannot be estimated from a single snapshot. Instead, the noise variances are re-interpreted as weighting factors $\lambda_n = \sigma^{-2}$, a viewpoint that is taken by BSS algorithms like DUET. Equation (62) can thus be rewritten as $$L(\theta) = \sum_{n=1}^{N} L_n^{reg}(\theta) \lambda_n,$$

reflecting both the regularization and the weighting. In practice, the signal bandwidths may not be known exactly and in some frequency bins the assumption of J signals breaks down. The problem of overfitting becomes severe in these bins and including them in the estimation procedure can distort results.

The following weights are provided to account for inaccurate modeling, high-noise bins, and outlier bins:

$$\tau_n = \varphi\left(\frac{\|\hat{P}_n(\theta)X_n\|}{\|X_n\|}\right) \quad (66)$$

$$\lambda_n = \frac{\tau_n}{\sum_{n=1}^{N} \tau_n} \quad (67)$$

where $\varphi$ is a non-negative non-decreasing weighting function. Its argument measures the portion of the received signal that can be explained given the DOA vector $\theta$. $\lambda_n$ are the normalized weights.

Particle Filter

Based on the weighting and regularization schemes, the concentrated likelihood function reads:

$$p(X_{1:N}|\theta) \propto e^{-\gamma L(\theta)} \quad (68)$$

where a scaling parameter $\gamma$ is introduced that determines the sharpness of the peaks of the likelihood function. A heuristic for $\gamma$ is provided below. However, this is the true likelihood function only if the true noise variance at frequency n is $\sigma_n^2 = (\gamma \lambda_n)^{-1}$. In what follows this is assumed to be the case. Now, the time dimension into the estimation procedure is included.

First, a Markov transition kernel is defined for the DOAs to relate information between snapshots:

$$p(\theta_j^k | \theta_j^{k-1}) = \alpha U_{[-\frac{\pi}{2}, \frac{\pi}{2}]} + (1-\alpha) N(\theta_j^{k-1}, \sigma_\theta^2) \quad (69)$$

where $0 \leq \alpha \ll 1$, $$U_{[-\frac{\pi}{2}, \frac{\pi}{2}]}$$

denotes the pdf of a uniform distribution on $$[-\frac{\pi}{2}, \frac{\pi}{2}],$$

and $N(\theta_j^{k-1}, \sigma_{\theta 2})$ denotes the pdf of a normal distribution with mean $\theta_j^{k-1}$ and variance $\sigma_\theta^2$. A small world proposal density according to "Yongtao Guan. Roland Fleissner, Paul Joyce, and Stephen M. Krone. Markov chain monte carlo in small worlds. Statistics and Computing, 16:193-202, June 2006" is used, because this is likely to speed up convergence, especially in the present case with multimodal likelihood functions.

Let $I^k$ denote all measurements (information) until snapshot k. Assume that a discrete approximation of the old posterior pdf is available:

$$p(\theta^{k-1} | I^{k-1}) = \sum_{i=1}^{P} w_i^{k-1} \delta_{\theta_i^{k-1}} \quad (70)$$

where the $$\delta_{\theta_i^{k-1}}$$

are Dirac masses at $\theta_i^{k-1}$. The $\theta_i^{k-1}$ are called particles with associated weights $w_i^{k-1}$. According to Bayes' rule:

$$p(\theta^k|I^k) \propto p(X_{1:N}^k|\theta^k)p(\theta^k|\theta^{k-1}) \qquad (71)$$

An approximation of the new posterior can be obtained as described in "Sanjeev Arulampalam, Simon Maskell, Neil Gordon, and Tim Clapp. A tutorial on particle filters for on-line non-linear/non-gaussian Bayesian tracking. IEEE Transactions on Signal Processing, 50:174-188, 2001" by resampling each particle from the transition kernel:

$$\theta_i^k \sim p(\theta_i^k|\theta_i^{k-1}), \qquad (72)$$

updating the weights with the likelihood, and renormalizing $$w_i^k = \frac{w_i^{k-1} p(X_{1:N} | \theta_i^k)}{\sum_{i=1}^{P} w_i^{k-1} p(X_{1:N} | \theta_i^k)} \qquad (73)$$

The parameter γ influences the reactivity of the particle filter. A small value puts small confidence into new measurements while a big value rapidly leads to particle depletion, i.e., all weight is accumulated by few particles. Through experimentation it was found that a good heuristic for γ that reduces the necessity for resampling of the particles while maintaining the method's speed of adaptation is:

$$\gamma = \frac{10}{\sum_{i=1}^{P} L(\theta_i)} \qquad (74)$$

A MAP estimate of θ can be obtained from the particles through use of histogram based methods. However, the particles are not spared from the permutation invariance problem as described in "H. Sawada, R. Mukai, S. Araki, and S. Makino. A robust and precise method for solving the permutation problem of frequency-domain blind source separation. Speech and Audio Processing, IEEE Transactions on, 12(5): 530-538, 2004." The likelihood function does not change its value if for some particle $\theta_{i,j}$ and $\theta_{i,j'}$ are interchanged. A simple EM-like clustering technique is used to account for this problem.

Complexity

The main load of the MUST implementation of a method provided herein in accordance with an aspect of the present invention is the computation of $(A_n^H A + \lambda_n I)^{-1}$ in Eq. (63), which has to be done for P particles and N frequency bins. Inversion of a real, positive definite J×J matrix requires $O(J^2)$ operations and can be carried out efficiently using BLAS routines. Accordingly, the complexity of updating the MAP estimates of θ is $O(NPJ^2)$. Note that the number J of sources also determines the number P of particles necessary for a good approximation.

Results of computer simulations are illustrated in FIGS. 23-25.

A practical technique to solve the wideband DOA estimation problem with MAP estimates has been provided above. In contrast to widely used subband techniques, MAP methods are robust to correlations and work with few samples, which is important to track moving sources. A reduced complexity weighting and regularization scheme has been provided herein to address for model inaccuracies and small number of microphones, two problems often encountered in practice. Recent advances in computing power make it feasible to use this method in the real world as shown by the simulations of scenario 2 as illustrated in FIG. 24. Further improvement provided herein over prior methods are: a tuning of the weighting and of the regularization heuristics and by including an estimation of the number of sources. Finally, the herein provided method in accordance with an aspect of the present invention provides the extension to J>M signals if no more than M signals are active at a given frequency.

A summary of the process in accordance with one aspect of the present invention is provided below. (step 1) Initialization of equation 69, with α=1. (step 2) Computation of $\hat{S}_n(\theta)$, is provided in accordance with equation 60. (step 3) Computation of $L_n(\theta)$ is provided in accordance with equation 61 (and 60). (step 4) Computation of weights which may be regularization weights $\tau_n$ to account for noise $\sigma_n$ is performed in accordance with equations 66 and 67. (step 5) Computation of likelihood $L(\theta)$ is performed in accordance with equation 62. (step 6) Computation of parameter γ gamma is performed in accordance with equation 74. (step 7) Computation of a concentrated likelihood is then performed in accordance with equation 68. (step 8) Updating a prior distribution is done in two steps. One calculates equation 71 or $p(\theta^k|I^k) \propto p(X_{1:N}^k|\theta_k) p(\theta^k|\theta_{k-1}) p(\theta^{k-1}|I^{k-1})$, given equation 70 and transition kernel equation 69 with α<1. Weight updates are provided using equation 73.

The vector θ is updated for each particle i.

The following references provide background information generally related to the present invention and are hereby incorporated by reference: [1] S. Arulampalam, S. Maskell, N. Gordon, and T. Clapp. A tutorial on particle filters for on-line non-linear/non-gaussian bayesian tracking. *IEEE Transactions on Signal Processing*, 50: 174-188, 2001. [2] R. G. Gallager. Circularly-symmetric gaussian random vectors. Class Notes, January 2008. [3] M. Jansson, A. L. Swindlehurst, and B. Ottersten. Weighted subspace fitting for general array error models. *IEEE Transactions on Signal Processing*, 46: 2484-2498, 1997. [4] T. Melia and S. Rickard. Underdetermined blind source separation in echoic environments using desprit, 2007. [5] S. Rickard, R. Balan, and J. Rosca. Real-time time-frequency based blind source separation. In *Proc. of International Conference on Independent Component Analysis and Signal Separation (ICA*2001*)*, pages 651-656, 2001. [6] C. P. Robert. The Bayesian Choice. Springer, 2nd edition, 2001. [7] H. Krim and M. Viberg. Two decades of array signal processing research: the parametric approach. Signal Processing Magazine, IEEE, 13(4): 67-94, July 1996. [8] R. Roy and T. Kailath. Esprit-estimation of signal parameters via rotational invariance techniques. Acoustics, Speech and Signal Processing, IEEE Transactions on, 37(7):984, July 1989. [9] R. Schmidt. Multiple emitter location and signal parameter estimation. Antennas and Propagation, IEEE Transactions on, 34(3):276, March 1986. [10] M. Viberg and B. Ottersten. Sensor array processing based on subspace fitting. Signal Processing, IEEE Transactions on, 39(5):1110-1121, May 1991. [11] P. Stoica and K. C. Sharman. Acoustics, speech and signal processing, Acoustics, Speech and Signal Processing, IEEE Transactions on, 38(7):1132, July 1990. [12] J. Lasenby and W. J. Fitzgerald. A bayesian approach to high-resolution beamforming. Radar and Signal Processing, IEE Proceedings F, 138(6):539-544. December 1991. [13] James A. Cadzow. Multiple source localization—the signal subspace approach. IEEE Transactions on Acoustics, Speech, and Signal Processing, 38(7):1110-1125, July 1990. [14] C.

Andrieu and A. Doucet. Joint Bayesian model selection and estimation of noisy sinusoids via reversible jump mcmc. Signal Processing, IEEE Transactions on, 47(10):2667-2676, October 1999. [15] J. Huang, P. Xu, Y. Lu, and Y. Sun. A novel bayesian high-resolution direction-of-arrival estimator. OCEANS, 2001. MTS/IEEE Conference and Exhibition, 3:1697-702, 2001. [16] H. Wang and M. Kaveh. Coherent signal-subspace processing for the detection and estimation of angles of arrival of multiple wide-band sources. Acoustics. Speech and Signal Processing, IEEE Transactions on, 33(4): 823, August 1985. [17] D. N. Swingler and J. Krolik. Source location bias in the coherently focused high-resolution broadband beamformer. Acoustics. Speech and Signal Processing, IEEE Transactions on, 37(1):143-145. January 1989. [18] Ta-Sung Lee. Efficient wideband source localization using beamforming invariance technique. Signal Processing, IEEE Transactions on, 42(6):1376-1387, June 1994. [19] Yeo-Sun Yoon, L. M. Kaplan, and J. H. McClellan. Tops: new doa estimator for wideband signals. Signal Processing, IEEE Transactions on, 54(6):1977. June 2006. [20] W. Ng, J. P. Reilly, and T. Kirubarajan. A bayesian approach to tracking wideband targets using sensor arrays and particle filters. Statistical Signal Processing, 2003 IEEE Workshop on, pages 510-513, 2003. [21] E. D. di Claudio and R. Parisi. Waves: weighted average of signal subspaces for robust wideband direction finding. Signal Processing, IEEE Transactions on, 49(10):2179, October 2001. [22] C. E. Chen, F. Lorenzelli. R. E. Hudson, and K. Yao. Maximum likelihood doa estimation of multiple wideband sources in the presence of nonuniform sensor noise. EURASIP Journal on Advances in Signal Processing, 2008: Article ID 835079, 12 pages, 2008. doi: 10.1155/2008/835079, 2008. [23] Huigang Wang, S. Kay, and S. Saha. An importance sampling maximum likelihood direction of arrival estimator. Signal Processing, IEEE Transactions on, 56(145082-5092, 2008. [24] Yongtao Guan, Roland Fleissner, Paul Joyce, and Stephen M. Krone. Markov chain monte carlo in small worlds. Statistics and Computing, 16:193-202, June 2006. [25] H. Hung and M. Kaveh. Focusing matrices for coherent signal-subspace processing. Acoustics, Speech and Signal Processing, IEEE Transactions on, 36(8):1272-1281, August 1988. [26] H. Sawada, R. Mukai, S. Araki, and S. Makino. A robust and precise method for solving the permutation problem of frequency-domain blind source separation. Speech and Audio Processing, IEEE Transactions on, 12(5):530-538, 2004.

A five page appendix providing further explanation of various aspect of the present invention is included.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for determining a direction of arrival of a first signal in a plurality of signals generated by a source in a plurality of sources, comprising:
a processor estimating a first direction of arrival for a previous signal generated by the source prior to the first signal with a particle filter operating in a time-frequency domain;
receiving by a plurality of receivers at a time t the plurality of signals from the plurality of sources, at least two of the received plurality of signals being correlated;
the processor determining a regularization factor and a weighting factor for each of a plurality of frequency components of the first signal;
the processor determining a likelihood for the direction of arrival for each of the plurality of frequency components of the first signal based on the regularization factor and the weighting factor;
the processor determining a global likelihood for the direction of arrival of the first signal based on the likelihood for the direction of arrival for each of the plurality of frequency components of the first signal;
the processor updating a plurality of weights of the particle filter; and
the processor generating an estimate of the direction of arrival of the first signal by applying the updated weights of the particle filter.

2. The method of claim 1, wherein the global likelihood $L(\theta)$ is determined by an expression:

$$L(\theta) = \sum_{n=1}^{N} L_n^{reg}(\theta)\lambda_n,$$

with $\theta$ representing a vector of all directions-of-arrivals for all the sources in the plurality of sources, n represents a frequency component, N represents a total number of frequency components, $L_n^{reg}(\theta)\lambda_n$ is a regularized likelihood of all directions-of-arrivals for all the sources adjusted by a normalized weighting factor $\lambda_n$ for a frequency component n.

3. The method of claim 1, wherein the weighting factor for a frequency component n is a normalized weighting factor $\lambda_n$ that is determined by an expression:

$$\lambda_n = \frac{\tau_n}{\sum_{n=1}^{N} \tau_n},$$

wherein $$\tau_n = \varphi\left(\frac{\|\hat{P}_n(\theta) X_n\|}{\|X_n\|}\right),$$

with $\tau_n$ representing an un-normalized weighting factor, $\hat{P}_n(\theta)$ representing a regularized projector for a frequency component n on a signal subspace, $\theta$ representing a vector of all directions-of-arrivals for all the sources in the plurality of sources, $X_n$ representing a vector of frequency components n of the plurality of signals received by the plurality of receivers and $\varphi$ representing a non-negative non-decreasing weighting function.

4. The method of claim 1, further comprising the processor determining a Maximum A Posteriori likelihood (MAP) estimate of a frequency component of the first signal.

5. The method of claim 4, wherein the MAP estimate represented by $\hat{S}_n(\theta)$ is determined by an expression:

$$\hat{S}_n(\theta) = (A_n^H A \lambda_n I)^{-1} + A_n^H X_n,$$

with $\theta$ representing a vector of all directions-of-arrivals for all the sources in the plurality of sources, A representing a steering matrix, $A_n^H$ representing a Hermitian of a steering matrix for a frequency component n, $\lambda_n$ representing a regularization factor for a frequency component n, I representing an identity matrix and $X_n$ representing a vector of frequency components n of the plurality of signals received by the plurality of receivers.

6. The method of claim 1, wherein the updated weights $w_i^k$ of the particle filter are determined by an expression:

$$w_i^k = \frac{w_i^{k-1} p(X_{1:N} | \theta_i^k)}{\sum_{i=1}^{P} w_i^{k-1} p(X_{1:N} | \theta_i^k)},$$

with k representing an update time, i representing a particle index, p representing a probability distribution function, P representing a total number of particles, $X_{1:N}$ representing a vector of frequency components at moment k, and $\theta_i^k$ representing a direction of arrival estimates of particle i at moment k.

7. The method of claim 6, wherein the global likelihood is adjusted with a scaling parameter.

8. The method of claim 1, wherein at least one source in the plurality of sources is a moving source.

9. The method of claim 1, wherein the first signal is an acoustic signal.

10. The method of claim 1, wherein at least one source in the plurality of sources is associated with a power generator.

11. A system to determine a direction of arrival of a first signal in a plurality of signals generated by a source in a plurality of sources, comprising:
 a memory enabled to store data and instructions;
 a processor enabled to retrieve and execute instructions from the memory to perform the steps:
  estimating a first direction of arrival for a previous signal generated by the source prior to the first signal with a particle filter operating in a time-frequency domain;
  processing the plurality of signals from the plurality of sources received at a time t by a plurality of receivers, at least two of the received plurality of signals being correlated;
  determining a regularization factor and a weighting factor for each of a plurality of frequency components of the first signal;
  determining a likelihood for the direction of arrival for each of the plurality of frequency components of the first signal based on the regularization factor and the weighting factor;
  determining a global likelihood for the direction of arrival of the first signal based on the likelihood for the direction of arrival for each of the plurality of frequency components of the first signal;
  updating a plurality of weights of the particle filter; and
  generating an estimate of the direction of arrival of the first signal by applying the updated weights of the particle filter.

12. The system of claim 11, wherein the global likelihood $L(\theta)$ is determined by an expression:

$$L(\theta) = \sum_{n=1}^{N} L_n^{reg}(\theta)\lambda_n,$$

with $\theta$ representing a vector of all directions-of-arrivals for all the sources in the plurality of sources, n represents a frequency component, N represents a total number of frequency components, $L_n^{reg}(\theta)\lambda_n$ is a regularized likelihood of all directions-of-arrivals for all the sources adjusted by a normalized weighting factor $\lambda_n$ for a frequency component n.

13. The system of claim 11, wherein the weighting factor for a frequency component n is a normalized weighting factor $\lambda_n$ that is determined by an expression:

$$\lambda_n = \frac{\tau_n}{\sum_{n=1}^{N} \tau_n},$$

wherein $$\tau_n = \varphi\left(\frac{\|\hat{P}_n(\theta)X_n\|}{\|X_n\|}\right),$$

with
$\tau_n$ representing an un-normalized weighting factor, $\hat{P}_n(\theta)$ representing a regularized projector for a frequency component n on a signal subspace, $\theta$ representing a vector of all directions-of-arrivals for all the sources in the plurality of sources, $X_n$ representing a vector of frequency components n of the plurality of signals received by the plurality of receivers and $\varphi$ representing a non-negative non-decreasing weighting function.

14. The system of claim 11, further comprising the processor determining a Maximum A Posteriori likelihood (MAP) estimate of a frequency component of the first signal.

15. The system of claim 14, wherein the MAP estimate represented by $\hat{S}_n(\theta)$ is determined by an expression:

$$\hat{S}_n(\theta) = (A_n^H A \lambda_n I)^{-1} + A_n^H X_n,$$

with $\theta$ representing a vector of all directions-of-arrivals for all the sources in the plurality of sources, A representing a steering matrix, $A_n^H$ representing a Hermitian of a steering matrix for a frequency component n, $\lambda_n$ representing a regularization factor for a frequency component n, I representing an identity matrix and $X_n$ representing a vector of frequency components n of the plurality of signals received by the plurality of receivers.

16. The system of claim 11, wherein the updated weights $w_i^k$ of the particle filter are determined by an expression:

$$w_i^k = \frac{w_i^{k-1} p(X_{1:N} | \theta_i^k)}{\sum_{i=1}^{P} w_i^{k-1} p(X_{1:N} | \theta_i^k)},$$

with k representing an update time, i representing a particle index, p representing a probability distribution function, P representing a total number of particles, $X_{1:N}$ representing a vector of frequency components at moment k, and $\theta_i^k$ representing a direction of arrival estimates of particle i at moment k.

17. The system of claim 16, wherein the global likelihood is adjusted with a scaling parameter.

18. The system of claim 11, wherein at least one source in the plurality of sources is a moving source.

19. The system of claim 11, wherein the first signal is an acoustic signal.

20. The system of claim 11, wherein at least one source in the plurality of sources is associated with a power generator.

* * * * *